(12) United States Patent
Katz et al.

(10) Patent No.: US 7,870,012 B2
(45) Date of Patent: Jan. 11, 2011

(54) METHOD FOR MANAGING A WORKFLOW PROCESS THAT ASSISTS USERS IN PROCUREMENT, SOURCING, AND DECISION-SUPPORT FOR STRATEGIC SOURCING

(75) Inventors: Steven Bruce Katz, Burlingame, CA (US); Yannis Labrou, Menlo Park, CA (US); Manoranjan Kanthanathan, Foster City, CA (US); Kenneth M. Rudin, San Carlos, CA (US)

(73) Assignee: Agile Software Corporation, San Jose, CA (US)

( * ) Notice: Subject to any disclaimer, the term of this patent is extended or adjusted under 35 U.S.C. 154(b) by 1883 days.

(21) Appl. No.: 09/858,122

(22) Filed: May 15, 2001

(65) Prior Publication Data

US 2002/0174000 A1 Nov. 21, 2002

(51) Int. Cl.
*G06F 9/44* (2006.01)
*G06F 17/50* (2006.01)
(52) U.S. Cl. .................... 705/7; 705/8; 705/10; 705/28
(58) Field of Classification Search ................ 705/7–8, 705/10, 26, 28, 35, 400
See application file for complete search history.

(56) References Cited

U.S. PATENT DOCUMENTS 4,799,156 A * 1/1989 Shavit et al. .................. 705/26

(Continued)

FOREIGN PATENT DOCUMENTS

WO WO 99/45486 9/1999

(Continued)

OTHER PUBLICATIONS

Babb, John, "Supply Chain Management Primer," Clarkston Group, Inc., 2000. Available on Internet: http://supplychain.ittoolbox.com/documents/document.asp?i=1095, pp. 1-12.

(Continued)

*Primary Examiner*—Beth V Boswell
*Assistant Examiner*—Nadja Chong Cruz
(74) *Attorney, Agent, or Firm*—Townsend and Townsend and Crew LLP

(57) ABSTRACT

A method for assisting a user with procurement decisions, sourcing decisions and strategic sourcing decisions in an enterprise is disclosed. The method implements a plurality of software modules in a logical workflow process based on the results of integrating and analyzing data. The workflow process provides a plurality of steps for discovering data, analyzing data, alerting the user about the data, recommending actions to the user based on the data, and executing those actions. The workflow process is based on a Value Chain Intelligence (VCI) system, which integrates and analyzes internal data from enterprises and external data from suppliers, catalogs, and marketplaces in real time for their impact on supply chains processes. Components for such a system may consist of internal data collection components, external data collection components, data integration components, and data application components. Various methods for searching, extracting, transforming, integrating, analyzing, and representing data internal to an enterprise and data external to an enterprise are also disclosed.

30 Claims, 11 Drawing Sheets

U.S. PATENT DOCUMENTS

| | | | |
|---|---|---|---|
| 4,887,207 A | 12/1989 | Natarajan | 364/401 |
| 4,992,940 A | 2/1991 | Dworkin | 364/401 |
| 5,128,861 A | 7/1992 | Kagami et al. | 364/403 |
| 5,319,542 A * | 6/1994 | King et al. | 705/27 |
| 5,491,629 A * | 2/1996 | Fox et al. | 702/3 |
| 5,521,813 A | 5/1996 | Fox et al. | |
| 5,710,887 A | 1/1998 | Chelliah et al. | 395/226 |
| 5,712,889 A | 1/1998 | Lanzara et al. | |
| 5,781,911 A | 7/1998 | Young et al. | 707/201 |
| 5,848,393 A | 12/1998 | Goodridge et al. | |
| 5,893,076 A * | 4/1999 | Hafner et al. | 705/28 |
| 5,913,214 A | 6/1999 | Madnick et al. | 707/10 |
| 5,953,707 A * | 9/1999 | Huang et al. | 705/10 |
| 5,970,475 A * | 10/1999 | Barnes et al. | 705/27 |
| 5,974,395 A | 10/1999 | Bellini et al. | 705/9 |
| 5,995,945 A | 11/1999 | Notani et al. | 705/28 |
| 6,023,683 A | 2/2000 | Johnson et al. | 705/26 |
| 6,029,150 A | 2/2000 | Kravitz | |
| 6,047,290 A | 4/2000 | Kennedy et al. | 707/103 |
| 6,055,516 A | 4/2000 | Johnson et al. | 705/27 |
| 6,055,519 A | 4/2000 | Kennedy et al. | 705/80 |
| 6,085,176 A | 7/2000 | Woolston | 705/37 |
| 6,085,220 A | 7/2000 | Courts et al. | 709/201 |
| 6,119,149 A | 9/2000 | Notani | 709/205 |
| 6,157,915 A | 12/2000 | Bhaskaran et al. | 705/7 |
| 6,208,990 B1 | 3/2001 | Suresh et al. | 707/6 |
| 6,282,656 B1 | 8/2001 | Wang | |
| 6,341,271 B1 * | 1/2002 | Salvo et al. | 705/28 |
| 6,363,359 B1 | 3/2002 | Gronemeyer et al. | |
| 6,671,673 B1 * | 12/2003 | Baseman et al. | 705/7 |
| 2001/0034673 A1 * | 10/2001 | Yang et al. | 705/28 |
| 2001/0047293 A1 * | 11/2001 | Waller et al. | 705/10 |
| 2002/0107819 A1 * | 8/2002 | Ouimet | 705/400 |
| 2002/0138316 A1 | 9/2002 | Katz et al. | |
| 2002/0178077 A1 | 11/2002 | Katz et al. | |
| 2002/0194057 A1 * | 12/2002 | Lidow | 705/10 |
| 2003/0033179 A1 | 2/2003 | Katz et al. | |

FOREIGN PATENT DOCUMENTS

| | | |
|---|---|---|
| WO | WO 0017773 | 3/2000 |
| WO | WO 0017774 | 3/2000 |
| WO | WO 0017798 | 3/2000 |
| WO | WO 0109803 | 2/2001 |

OTHER PUBLICATIONS

*B2B: Building Technology Bridges Outside the Four Walls of the Enterprise*. Robertson Stephens Report. Aug. 15, 2000, p. 21-30.

"Business Intelligence in the New Economy." Fairfax, Virginia: Intelix, Inc., 2001, p. 1-14. Available on the Internet at http://businessintelligence.ittoolbox.com/documents/document.asp?i=1032.

Chen, Ming-Syan, Jiawei Han and Philip S. Yu. "Data Mining: An Overview from Database Perspective," pp. 1-40. Available on the Internet at http://citeseer.nj.nec.com/chen96data.html.

Dombroski, Glenn. "Walking the Razors Edge: Threaded Simultaneous Supply Chain Planning." Caelus, Inc. 2001. Available on the Internet at http://supplychain.ittoolbox.com/documents/document.asp?i=575.

*The eCommerce:B2B Report*. eMarketer.com. Jul. 2000, p. 109-151.

Ferrier, Karen. "OLAP & Data Mining: Bridging the Gap." Keynote speech in Database Programming and Design at Data Mining Summit. Feb. 1997. Available on the Internet at http://www.datamine.aa.psiweb.com/bridge.htm.

Ganeshan, Ram, and Terry P. Harrison. "An Introduction to Supply Chain Management." 1995. Available on the Internet at http://silmaril.smeal.psu.edu/misc/supply_chain_intro.html.

Inmon, William H. (ed.), Ken Rudin, Christopher Buss, and Ryan Sousa. *Data Warehouse Performance*. New York John Wiley & Sons, 1998.

Kimball, Ralph. *The Data Warehouse Toolkit: Practical Techniques for Building Dimensional Data Warehouses*. New York: John Wiley & Sons, 1996.

Koch, Christopher. "Four Strategies." CIO Magazine. Oct. 1, 2000. Available on the Internet at http://www.cio.com/archive/100100_four.html.

Lee, Mong Li, Hongjun Lu, Tok Wang Ling, and Yee Teng Ko. "Cleansing Data for Mining and Warehousing," Proceedings of the 10$^{th}$ International Conference on Database and Expert Systems Applications (DEXA), Florence, Italy, Aug. 1999, p. 1-10. Available on the Internet at http://citeseer.nj.nec.com/lec99cleansing.html.

Whang et al., "Information Flows in Manufacturing under SAP R/3." Working paper. Jun. 1995. Stanford University, Graduate School of Business, p. 1-17.

White, Colin. "Multidimensional OLAP vs. Relational OLAP." InfoDB 10(2): 1-4. Available on the Internet at http://www.dbaint.com/InfoDBDW.html.

Winsberg, Paul. "Modeling the Data Warehouse and Data Mart." InfoDB 10(2): 1-10. Available on the Internet at http://www.dbaint.com/InfoDBDW.html.

Final Office Action for U.S. Appl. No. 09/927,975 mailed on Dec. 6, 2005; pages.

Non-Final Office Action for U.S. Appl. No. 09/866,115 mailed on Mar. 10, 2004; 7 pages.

Final Office Action for U.S. Appl. No. 09/866,115 mailed on Sep. 8, 2004; 7 pages.

Non-Final Office Action for U.S. Appl. No. 09/815,927 mailed on Feb. 1, 2005; 31 pages.

Examiner Interview Summary for U.S. Appl. No. 09/815,927 mailed on Sep. 23, 2005; 2 pages.

"A far-reaching impact - Microsoft Windows NT gains favor with supervisory-control vendors, users," Manufacturing Systems.com, Jul. 1996, 100-102, 104, and 106 pages.

Aspect solutions for design, procurement & operations Aspect 1997 Annual Report-Solutions, downloaded from http://web.archive.org/web/20000425022352/http://www.aspectdv.com/Annualreports/ar97/dpo.html, printed on Aug. 9, 2010, 7 pages.

"Aspect CSM: The only one-stop solution" Aspect 1997 Annual Report—CSM Solution, downloaded from http://web.archive.org/web/20000606032117/http://www.aspectdv.com/Annualreports/ar97/csm.html, printed on Aug. 9, 2010, 3 pages.

"Buyer Frequently Asked Questions," Suppliermarket.com-About the Marketplace-Buyer: downloaded from http://web.archive.org/web/20000620133552/www.suppliermarket.com/public/aboutffaq_buyer.html, printed on Aug. 9, 2010, 4 pages.

"Gensym Is the Intelligent Choice," Upside, Sep. 1996, p. 102.

"Gensym introduces G2 WebMiner for accessing and reasoning about data from the World Wide Web," Business Wire, May 15, 1996, Business Wire, Inc, Cambridge Massachusetts; 2 pages.

"it's about enterprise systems that deliver," Aspect 1997 Annual Report—CIO Perspective, downloaded from http://web.archive.org/web/20001031015635/http://www.aspectdv.com/Annualreports/ar97/cio.html, printed on Aug. 9, 2010. 2 pages.

"Ingersoll-Rand paves the way for saving with CMS," Aspect 1997 Annual Report-Customer Focus Ingersoll Rand, downloaded from http://web.archive.org/web/20000607141115/http://www.aspectdv.com/Annualreports/ar97/irand.html, printed on Aug. 9, 2010, 1 page.

"it's about reducing product cost," Aspect 1997 Annual Report—CPO Perspective, downloaded from http://web.archive.org/web/20001031015635/http://www.aspectdv.com/Annualreports/ar97/cio.html, on Aug. 9, 2010, 2 pages.

"it's about slashing the design cycle," Aspect 1997 Annual Report—CPO Perspective, downloaded from http://web.archive.org/web/20000606100850/http://www.aspectdv.com/Annualreports/ar97/cto.html, on Aug. 9, 2010, 2 pages.

Parker, "Too much information? Web-based tools help managers cope," Manufacturing System.com, Sep. 1996, 16 and 18 pages.

* cited by examiner

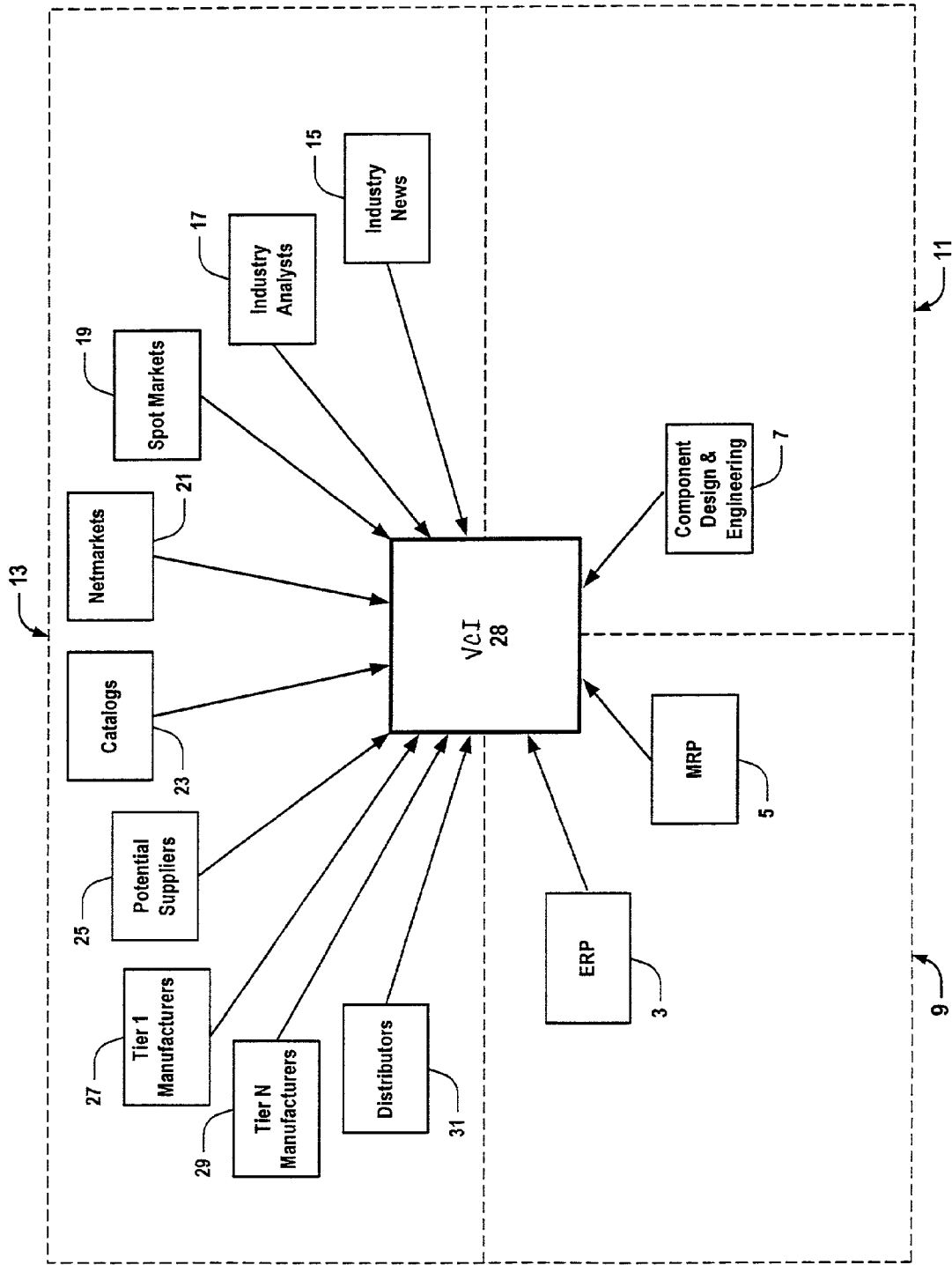

METHOD FOR MANAGING A WORKFLOW PROCESS THAT ASSISTS USERS IN PROCUREMENT, SOURCING, AND DECISION-SUPPORT FOR STRATEGIC SOURCING

FIELD OF THE INVENTION

This invention relates generally to the fields of procurement, strategic sourcing, contract negotiation, supplier management, data warehousing, supply chain management, and enterprise software. More particularly, the present invention relates to a computer-implemented system, method and process for providing value chain intelligence and the use thereof in an enterprise.

BACKGROUND OF THE INVENTION

A supply chain encompasses all of the activities associated with the process of moving goods through a network of facilities and distribution channels from suppliers to manufacturers to distributors to retailers to final consumers. Managing the chain of events in this process is known as Supply Chain Management (SCM). Companies use SCM to make critical decisions about production, purchasing, scheduling, transportation, warehousing, order processing, inventory control, information management, and customer service. The key to the success of a supply chain often is the speed with which these activities can be accomplished. The results of a successful SCM system can lead to reduced inventories, lower operating costs, shorter time-to-market, and increased customer satisfaction.

SCM applications generally perform one of two functions: planning or execution. Supply chain planning applications design and implement scheduling systems for enterprise systems. Supply chain execution applications focus on SCM logistics, such as coordinating the production, transportation and storage of materials. This artificial division of labor between planning and execution in SCM applications has limited their effectiveness.

Sourcing and procurement are critical to SCM processes. Sourcing generally deals with the search for and identification of suppliers of materials and services; it can be more strategic than procurement. Sourcing often involves locating potential suppliers and then evaluating, developing and managing their capabilities in a manner consistent with the enterprise's plans for meeting customer expectations and needs. Procurement, on the other hand, generally deals with the day-to-day activities of purchasing materials. Procurement can be more tactical than sourcing.

Sourcing is intended for the strategic sourcing group of an enterprise, which is concerned with long term decision-making about which materials to source, from which suppliers, under what contract terms, etc. Procurement is targeted to the enterprise's buyers, who must deal with the day-to-day tasks of purchasing the necessary materials for the enterprise's production-related operations. The primary goals of procurement is to ensure the uninterrupted supply of materials by purchasing under contract from current suppliers, by identifying new suppliers, and by purchasing from new and existing marketplaces.

Current procurement applications focus on the procurement of indirect or Maintenance, Repair and Operating (MRO) materials, but not on direct materials. MRO materials are not related to manufacturing; they include copy toner, light bulbs, toilet paper, etc. Direct materials, on the other hand, are directly related to manufacturing and include a wide variety of product components. One of the primary distinctions between direct and indirect materials is that indirect materials do not require customization because they can be purchased from a catalog. Direct materials, however, may require customization depending on the type of product, process or system being implemented. In addition, because direct materials are critical to the manufacturing process, a variety of considerations relating to continuous quality supply have to be made.

With constant mergers and acquisitions, the increasing use of outsourcing, and shortening product life cycles, global manufacturers are facing challenges that increasingly fragment an already complex and extended procurement process. Considering that the majority of manufacturer's expenses come from the procurement of direct goods, enterprise solutions that can identify cost saving opportunities and mitigate risks are becoming more critical to business operations. The present invention, a Value Chain Intelligence (VCI) system and methods based thereon, provides improved solutions to such problems. For instance, a large enterprise, such as Motorola or other phone/system manufacturer, can use a VCI system to locate chip components on the spot market at lower prices than its current contract pricing. In another example, an enterprise, such as Ericsson or other phone/system manufacturer, can use a VCI system to locate additional suppliers for critical cell phone components when an unexpected event like a manufacturing plant fire creates a shortage of those necessary components. The present invention provides these solutions by not only integrating enterprise and marketplace information, but also by analyzing that information and alerting users about opportunities to reduce risk and save costs.

With the growth of the Internet and the resulting changes in the speed and access of information, it has been determined that companies would greatly benefit from solutions that provide continuous access to the many types of information that are now available and can intelligently incorporate this information into their SCM processes. If such access were provided (as in accordance with the present invention), companies would be able to analyze both enterprise data and market data for risks and opportunities, make strategic decisions based on those risks and opportunities, and be able to automate their operations around this critical information. It thus would be highly advantageous for companies to be able to integrate these solutions into their SCM processes.

Existing enterprise applications, however, have focused on streamlining internal processes without incorporating external data from suppliers and markets. With the recent development of private and public online marketplaces, which generate a wealth of potentially useful external data, it has been discovered that enterprise applications, such as in accordance with embodiments of the present invention, now have the opportunity to access critical external data from these sources and integrate this data with the internal data of enterprise systems. Unfortunately, prior to the present invention internal supply chain data from a variety of custom databases and Enterprise Resource Planning (ERP) applications has remained fragmented across multiple systems, and the relevant external data are frequently dispersed and difficult to access. Thus, existing applications currently do not have the tools to access or integrate external data with internal data.

The present invention is an effort to address such limitations of conventional approaches with a Value Chain Intelligence (VCI) system, which integrates the external and internal data required by manufacturing companies to gain strategic insights into ever-changing business demands and requirements. Targeting procurement and supply chain professionals, VCI systems in accordance with the present invention provide a variety of solutions that enable companies to reduce the risk of shortages, quickly take advantage of market opportunities, and improve overall capital efficiency. Such VCI systems allow companies to access external supplier and spot market data, integrate this data with internal data from multiple enterprise systems, analyze the impact of this data on the supply chain to identify risks and opportunities, and act on these findings. Such VCI systems may be used to combine supply chain planning and execution functions with other services, such as data integration, demand forecasting, and continuous market analysis, enabling users to not only gain insights into their supply chain operations, but also share the data among all participants in the supply chain network.

SUMMARY OF INVENTION

The present invention provides what is referred to herein as a Value Chain Intelligence (VCI) system, and methods for implementing and using such a VCI system. In accordance with the present invention, a VCI system is provided that may be used to improve the efficiency of procurement professionals by searching, gathering, analyzing, and organizing data from a plurality of enterprise and marketplace sources, and enabling professionals to leverage market and supply chain conditions in real time. As will be appreciated, the present invention may be generally utilized for improving decision-making in enterprises. The present invention preferably includes internal data collection components, external data collection components, data integration components, and data application components. The present invention preferably integrates internal data from enterprises and external data from suppliers, catalogs, and marketplaces, implementing a plurality of application modules in a logical workflow process.

An object of the present invention is to provide a system and methods for integrating planning and execution applications with external market data (and other external data) and internal enterprise data in real time and in accordance with the present invention.

Another object is to provide a system and methods for integrating internal data from enterprise systems and internal data from data marts with real-time external data from suppliers, vendors, catalogs, and online marketplaces in accordance with the present invention.

A further object is to provide a system and methods for data discovery functions of VCI systems, including the data extraction, data transformation, data loading, real-time searching, and customization of alerts in accordance with the present invention.

Still a further object of the present invention to provide a system and methods for data analysis functions of VCI systems, including data visualization, forecasting, risk analysis, and what-if scenarios in accordance with the present invention.

Another object of the present invention to provide a system and methods for recommendation functions of VCI systems, including inventory management, contract negotiations, purchasing recommendations, data optimization, supplier allocation, demand aggregation, spot market analysis, and market and news alerts in accordance with the present invention.

Yet another object is to provide a system and methods for automation/execution functions of VCI systems, including partial and full automation, alert mechanisms, report generation, and e-mail notifications in accordance with the present invention.

Still another object of the present invention is to provide a system and methods for integrating VCI functions and services with other enterprise applications in accordance with the present invention.

A further object of the present invention is to provide a system and methods for providing a customizable user interface that integrates internal and external data for automation/execution functions of VCI systems in accordance with the present invention.

Another object of the present invention is to provide methods and systems for producing scalable data marts that can manage large data sets and accommodate rapid data growth, while integrating VCI functions and services with other process-oriented SCM applications in accordance with the present invention.

BRIEF DESCRIPTION OF THE DRAWINGS

The present invention may be more fully understood by a description of certain preferred embodiments in conjunction with the attached drawings in which:

FIG. 1C is a diagram illustrating an exemplary embodiment of a VCI system in accordance with the present invention;

DETAILED DESCRIPTION OF THE PREFERRED EMBODIMENTS

The present invention will be described in greater detail with reference to certain preferred and alternative embodiments. As described below, refinements and substitutions of the various embodiments are possible based on the principles and teachings herein.

Figure 1A:
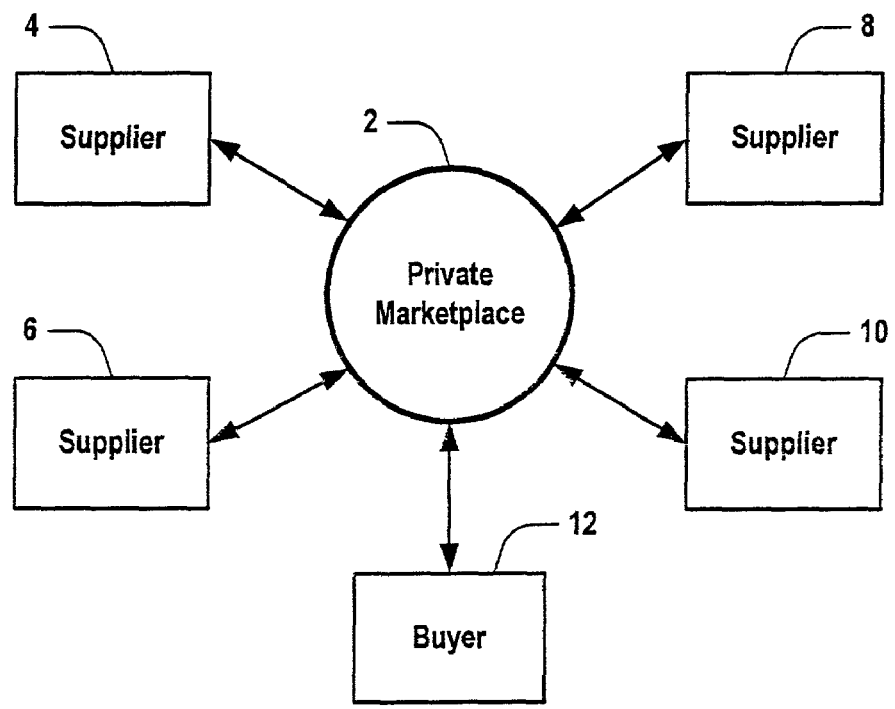
FIG. 1A is a diagram illustrating a conventional private marketplace.

FIG. 1A illustrates an exemplary embodiment of a conventional private marketplace. As illustrated in FIG. 1A, private marketplace 2 links a plurality of suppliers 4-10 with single buyer 12, providing a one-to-many commerce hub. Private marketplaces 2, like an on-line exchange, tend to focus on improving existing trading relationships and building better integration of channel partners. For example, a large enterprise, such as Dell Computer, may develop a private marketplace for a select group of its suppliers, so that it can purchase and source materials on a needs basis. An enterprise may use private marketplaces to provide access to internal enterprise data and automate the purchasing process with select suppliers, but private marketplaces are often limited to a specific enterprise, do not provide access to broader market data, and are difficult if not costly to develop, maintain, and update.

Figure 1B:
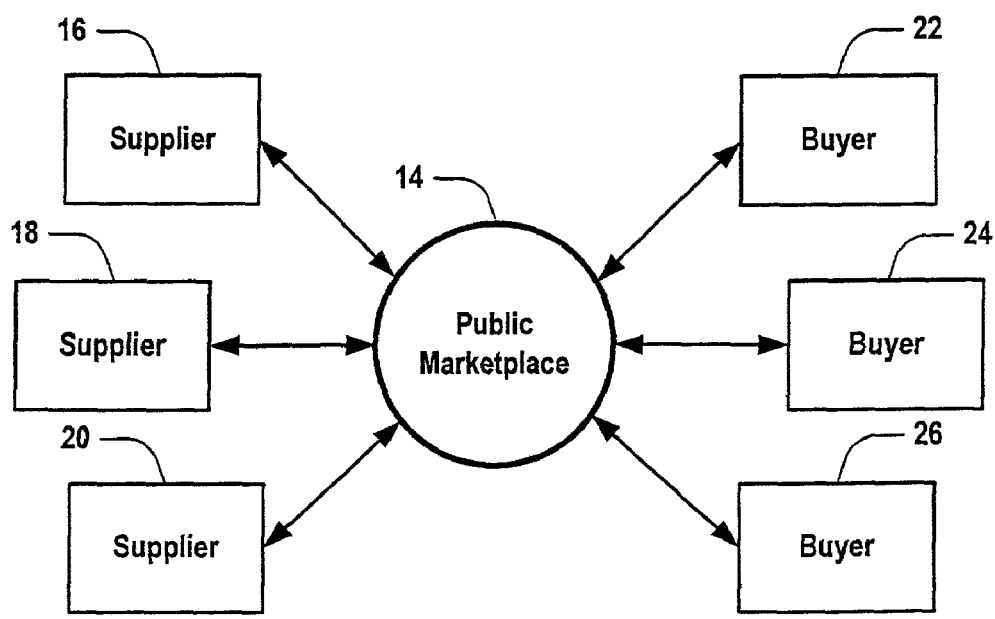
FIG. 1B is a diagram illustrating a conventional public marketplace.

FIG. 1B illustrates an exemplary embodiment of a conventional public marketplace. As illustrated in FIG. 1B, public marketplace 14 links a plurality of suppliers 16-20 with a plurality of buyers 22-26, serving as a many-to-many commerce hub. Public marketplaces function as centralized venues for improving price discovery, increasing vendor networks, and decreasing distribution costs. For example, a B2B e-commerce company, such as Ariba or CommerceOne, may integrate an enterprise with an open exchange to provide real-time access to a competitive marketplace for suppliers and buyers, so buyers can purchase MRO goods from suppliers and vice versa. However, public marketplaces tend to connect only a segment of the total number of buyers and suppliers, and generally have been limited to mostly indirect goods and services; therefore, they do not provide access to the range of data necessary to make more optimum strategic sourcing decisions.

Traditionally, enterprises have been required to develop custom tools for managing procurement and sourcing. For example, the data for such tools has included ERP data, Material Resource Planning (MRP) data, and data from design engineers, and has often been provided in a variety of formats, such as print-outs, e-mails, and custom reports that had to be specially requested to the IT department, who then integrate such data into custom tools, such as Excel spreadsheets. The development of such custom tools can be costly and entail contracting expensive consultants. Moreover, since these tools are customized for legacy systems, they are seldom able to efficiently integrate with state-of-the-art technologies. More often than not, the end-users would develop their own versions, mainly spreadsheets, of such tools, in order to cope with their daily tasks. The end result is that procurement and supply chain professionals are restricted in their efforts to reduce costs, mitigate risk, and identify opportunities by having to use tools that not only provide limited access to disparate enterprise data, but also provide fragmented and insufficient access to critical marketplace and other external data necessary for making tactical and strategic decisions. Even more importantly, such tools lack the ability to integrate external to internal data, and vice versa, on a continuous basis. Furthermore, such tools would typically provide very limited discovery and analysis services, since these tools were conceived and implemented by the individual users, such as procurement professionals, who use them for the particular task at hand, thus limiting their efficacy across the entire enterprise.

FIG. 1C illustrates an exemplary embodiment of a Value Chain Intelligence (VCI) system in accordance with the present invention. VCI system 28 is an enterprise system that preferably collects, analyzes and integrates data from a plurality of data sources internal to an enterprise with data from a plurality of data sources external to an enterprise, enabling users to leverage market and supply chain conditions to make better decisions about sourcing and procurement. As illustrated in FIG. 1C, VCI system 28 links one or a plurality of data sources, such as ERP system 3 and MRP system 5, inside the enterprise (as illustrated by dimension 9). VCI system 28 also preferably links one or a plurality of additional data sources, such as component or product design and engineering source 7, inside the business unit and involved in designing and modifying the design of products or systems for the enterprise, which typically includes specifying components and the like, and generally may be considered a different domain within the enterprise as compared to ERP system 3 and MRP system 5, etc. (as illustrated by dimension 11). Data sources within dimensions 9 and 11 are preferably internal to the enterprise. In addition to these sources, VCI system 28 links a plurality of data sources outside the enterprise, including, for example, industry news 15, industry analysts 17, spot markets 19, net markets 21, vendor catalogs 23, potential suppliers 25, tier 1 manufacturers to tier N manufacturers, and distributors 31 (as illustrated by dimension 13). Data sources within dimension 13 are preferably external to the enterprise. For example, a large enterprise, such as Motorola, may connect its proprietary data to VCI system 28, which provides access to data from manufacturers, distributors, suppliers, vendors, exchanges, and news services, and vice versa. Accordingly, the large enterprise is provided tools in a desirable manner in order to be able to negotiate not only the purchase but also the sale of direct materials based on current contract, spot market prices, and up-to-date needs and requirements. Thus, unlike private exchanges, VCI system 28 can provide access to external data outside a customer's enterprise, and unlike public exchanges it can provide access to a greater range of external data critical to making strategic decisions about market and supply chain conditions. In accordance with the present invention, VCI system 28 obtains and discovers a wide variety of internal and external data for particular components or other items, with the data typically originating in widely disparate forms and formats, with the data transformed and stored in a manner so as to be flexibly queried (such as by part number, type or characteristic such as by manufacturer, memory density, speed, functional characteristics, and the like) and continuously updated, thereby enabling a more optimum strategic decision-making process.

Figure 2:
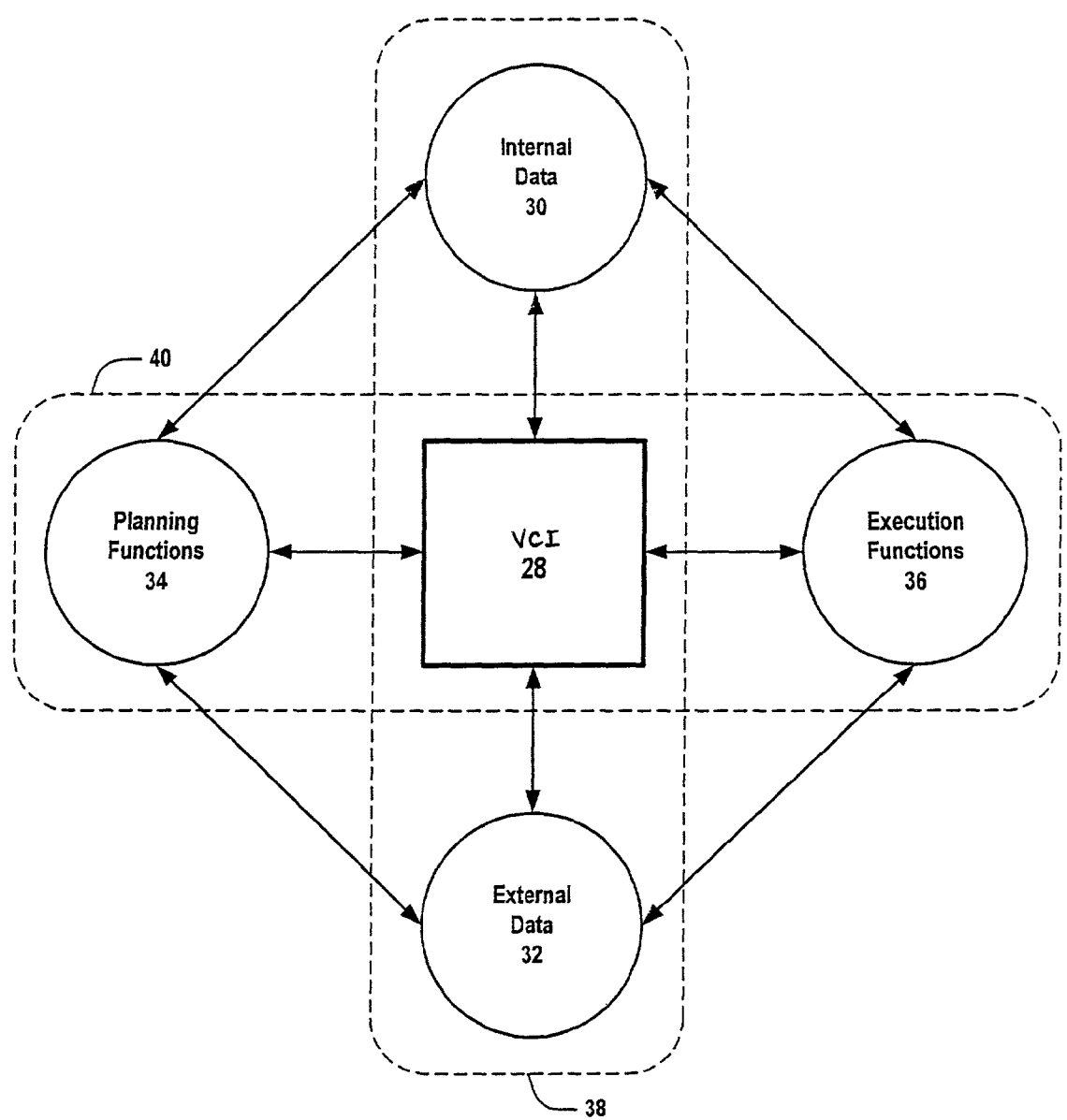
FIG. 2 is a diagram illustrating a VCI system that integrates internal and external data with planning and execution applications in accordance with preferred embodiments of the present invention.

FIG. 2 is a diagram illustrating a VCI system that integrates internal and external data with planning and execution applications in accordance with preferred embodiments of the present invention. VCI system 28 is an enterprise system comprised of a plurality of applications and components that gather internal data and external data, analyze this data for specified tasks, make strategic recommendations based on the analyses, and execute various operations based on the recommendations. VCI system 28 preferably includes applications and components that integrate internal data 30, external data 32, planning functions 34, and execution functions 36. Internal data 30 preferably consist of proprietary data (typically intrinsic or having particular relevance to the particular enterprise) that are retrieved from a plurality of customer enterprise systems, such as ERP systems, SCM systems, supply databases, internal parts databases, inventories, etc., which may exist across one or multiple business units within the enterprise (i.e., business units that manufacture different products that include common or similar components, etc.). External data 32 preferably consist of data that exist outside the customer's enterprise system (typically having relevance to the enterprise and competing and other enterprises, such as product offerings that are generally available or news events of general relevance to participants in particular industries, etc.) that are retrieved from a plurality of sources, such as suppliers, potential suppliers, product databases, electronic catalogues, online marketplaces, etc. Planning functions 34 frequently consist of analytical tools for the aggregation and organization of data, such as ERP applications that are used to facilitate the production process. Execution functions 36 frequently consist of logistical execution tools, such as SCM applications that manage the transportation, storage, and procurement of supplies. VCI system 28 preferably integrates the functions and services of a plurality of enterprise applications (as illustrated by dimensions 40) with a plurality of internal and external data (as illustrated by dimensions 38).

Current enterprise systems, however, do not have the capability to integrate all of these functions and different data sources. Current enterprise systems, such as ERP and SCM systems, tend to combine the capabilities of planning functions 34 and execution functions 36, but do not integrate these functions with external data 32. In other words, at the present time enterprises provide access to some forms of internal data 30, but not to external data 32 and the widely disparate forms and formats of external data as with embodiments of the present invention. Therefore, users of current enterprises do not have access to the continuous supply of both internal and external data necessary for making critical business decisions. In contrast, VCI system 28 in accordance with the present invention integrates these functions and data, enabling users to access, analyze, evaluate, and execute operations in order to make strategic and tactical decisions about operations based on the range of available data.

Figure 3A:
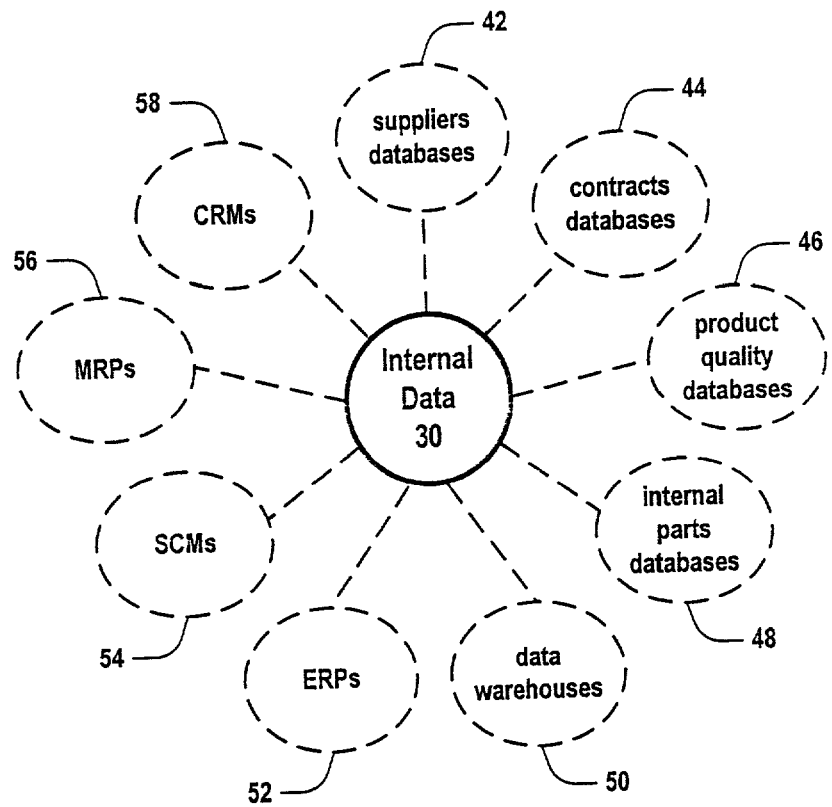
FIG. 3A illustrates examples of internal data and internal data sources in accordance with preferred embodiments of the present invention.

FIG. 3A illustrates examples of internal data sources and respective types of internal data in accordance with the present invention. Internal data 30 preferably are comprised of proprietary data aimed at and/or operated by an enterprise from a plurality of internal data sources, including but not limited to suppliers' databases 42, contracts' databases 44, product quality databases 46, internal parts databases 48, data marts 50, ERP systems 52, SCM systems 54, MRP systems 56, and Customer Relations Management (CRM) systems 58. (Proprietary data generally are privately owned data that may require a special arrangement, such as a contract, partnership, etc., with the enterprise and data provider in order to use or purchase access to the data.) Since internal data 30 originate from a plurality of sources, internal data 30 are extracted in a variety of formats and therefore require transformation (which will be described further below). Internal data from suppliers' databases 42 preferably include proprietary information about suppliers, such as supplier ratings, fill rates, just-in-time reports, etc. Internal data from contracts databases 44 preferably include proprietary information about client contracts, such as contract terms, pricing, delivery schedules, allocation terms, custom pricing, adjustments, etc. Internal data from product quality databases 46 preferably include proprietary information about the quality of specific products and manufacturers, such as internal reports, product change requests, warranty information, etc. Internal data from internal parts databases 48 preferably include proprietary information about parts, such parts catalogs, spare or other parts inventories, manufacturer's lists, parts equivalence data, etc. Internal data from data marts 50 preferably include a plurality of proprietary information, such as supply inventories, manufacturer directories, retailer directories, account information, other customized and integrated data, etc. Internal data from ERP systems 52 preferably include proprietary information about internal operations, such as accounting systems, purchasing records, various inventories and ledgers, etc. Internal data from SCM systems 54 preferably include proprietary information about supply chain operations, such as inventory logs, production schedules, transportation schedules, warehouse locations, etc. Internal data from MRP systems 56 preferably include proprietary information about internal resource planning, such as, purchase orders, work orders, production schedules, stock room data, Bill of Materials (BOM) data, etc. Internal data from Customer Relationship Management (CRM) systems 58 preferably include proprietary information about customer relations, such as address directories, customer preferences, site information, vital customer data, etc. It should be noted that in accordance with the present invention, internal data 30 are not limited to these types and sources of proprietary information, but may also include alternate types and sources of information internal to a customer's enterprise.

Figure 3B:
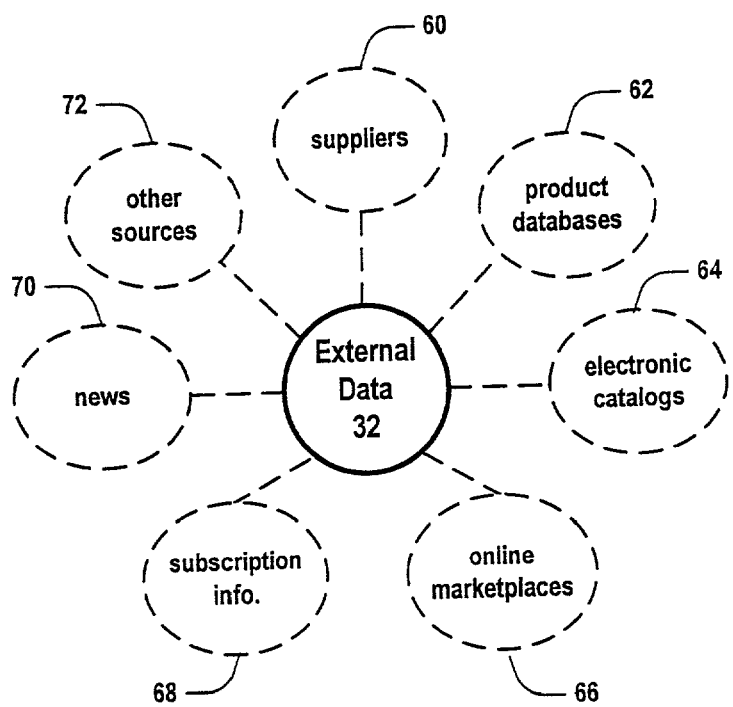
FIG. 3B illustrates examples of external data and external data sources in accordance with preferred embodiments of the present invention.

FIG. 3B illustrates examples of external data sources and respective types of external data in accordance with the present invention. External data 32 preferably are comprised of data originating outside an enterprise, which may include historically contingent or other information of general interest to an enterprise, industry and/or market (including competing enterprises); and/or historically contingent or other information affecting the goods and services of an enterprise, industry and/or market; and/or data used internally by another enterprise that formerly originated outside of that enterprise. External data 32 typically has relevance beyond the particular enterprise (including the enterprise's competitors), and thus discovering and accessing such external data in a timely and intelligent manner can enable the enterprise to more timely make improved strategic decisions as compared to its competitors, thus providing substantial advantages, particularly, for example, in times of fluctuating prices, shortages due to emergencies and the like, discontinuations, etc. External data 32 preferably originates from a plurality of data sources, including but not limited to suppliers 60, product databases 62, electronic catalogs 64, online marketplaces 66, subscription sources 68, news sources 70, and other sources 72. Since external data 32 also originate from a plurality of sources, external data 32 are extracted in a variety of formats as well and thus require transformation (which will be described further below). External data from suppliers 60 preferably comprise data about suppliers and vendors, such as catalogs, prices, product specifications, etc., from a plurality of supplier and vendor databases. External data from product databases 62 preferably include data about products, such as product name, product description, part numbers, compatible parts, specifications, etc., from a plurality of product databases. External data from electronic catalogs 64 preferably include data about parts and components from a plurality of electronic and Web-accessible sources. External data from online marketplaces 66 preferably include information about current market data, such as price, availability, lead time, etc., from a plurality of online marketplaces, such as private exchanges, public exchanges, third-party exchanges, consortia-led exchanges, information hubs, electronic auctions, etc. External data from subscription sources 68 preferably include subscription information about goods, services and industry trends, such as market reports, news bulletins, supplier ratings, etc., from a plurality of subscription-based sources. External data from news sources 70 preferably include information about goods, services and industry trends, such as daily news broadcasts, API articles, reports, bulletins, trade journals and their electronic counterparts, etc., from a plurality of Web-accessible news sources. External data from other sources preferably include information from alternate types of data sources. It should be noted that external data 32 are not limited to these sources of external information, but may also include alternate types and sources of information external to a customer's enterprise.

Figure 4:
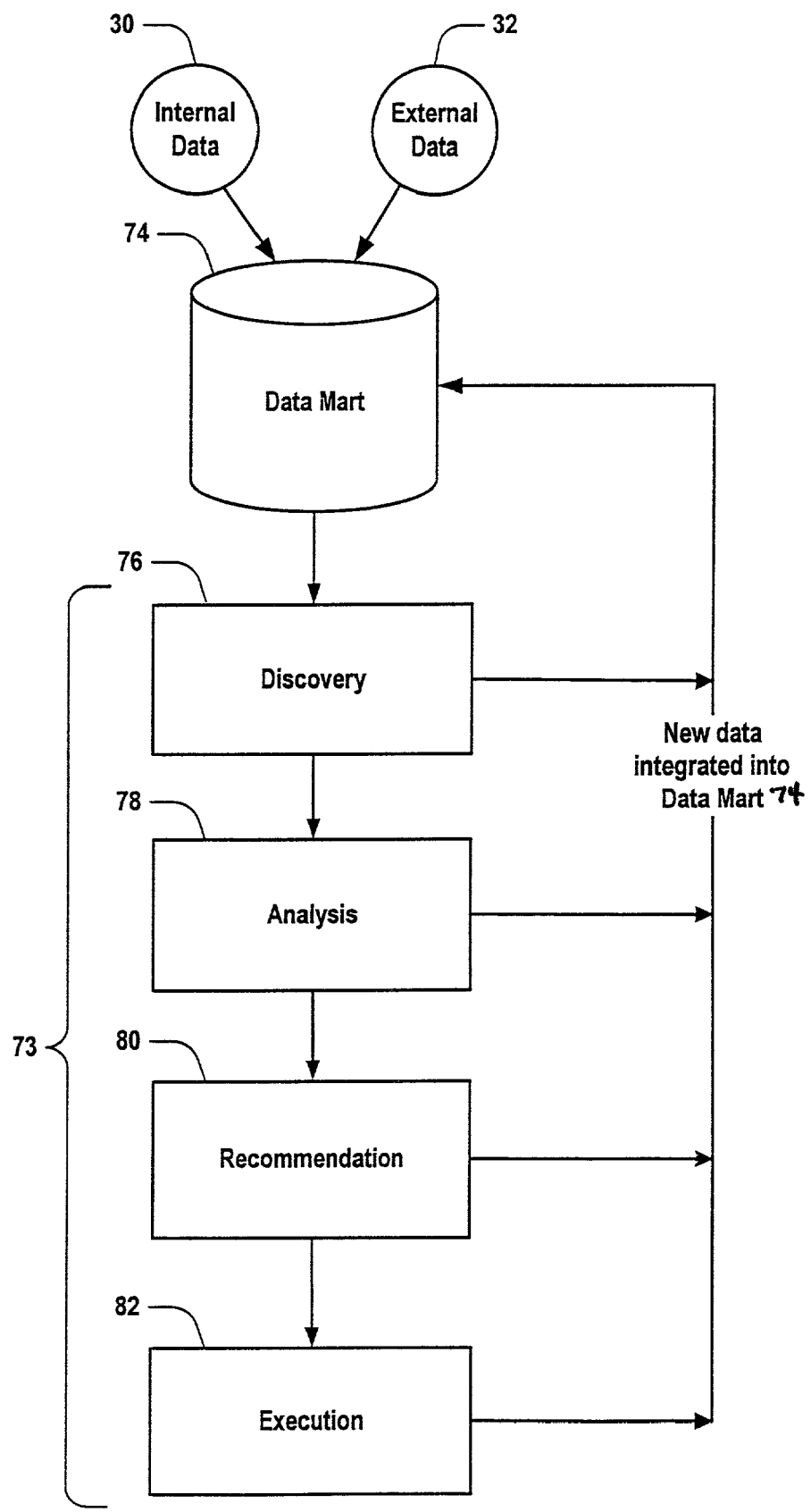
FIG. 4 is a flow chart illustrating the workflow process and services of a VCI system in accordance with preferred embodiments of the present invention.

FIG. 4 is a high-level flowchart illustrating preferred embodiments of the workflow process and services of VCI system 28. The present invention provides software applications in the form of individual components (i.e., modules) and bundled components (i.e., application suites) that preferably implement VCI system 28 in a step-by-step workflow process. Internal data 30 and external data 32 are loaded into data mart 74 and processed by a plurality of modules, which deliver a plurality of functions and implement VCI workflow process 73. VCI workflow process 73 preferably embodies a process of discovery, analysis and execution, with the possibility of the inclusion of one or more intermediate steps, such as discovery services 76, analysis services 78, recommendation services 80, and execution services 82. In alternate preferred embodiments, VCI workflow process 73 may include discovery services, analysis services, and execution services, or discovery services, alert services, analysis services, and execution services, or discovery services, alert services, analysis services, recommendation services and execution services, or discovery services, analysis services, and alert services, respectively (i.e., in accordance with various embodiments of the present invention, the combination of services may desirably be selected and/or controlled to provide the desired level and type of services to support VCI workflow process 73). Data mart 74 preferably includes a plurality of databases and database management systems that collectively store and analyze internal data 30 and external data 32. At each step in VCI workflow process 73, the resulting data is preferably reintegrated back into data mart 74, where it may be incorporated into a subsequent generation of data.

Thus, the user, when accessing the functionalities of the modules, is guided through a workflow process. For example, in an exemplary embodiment of the present invention, VCI workflow process 73 includes discovery, analysis, recommendation, and execution. Accordingly, discovery services 76 assist the user in identifying a plurality of parameters for criteria that are important to the user's tasks, so that the user can obtain necessary data for making business decisions. Analysis services 78 use the input of the discovered data to produce a variety of reports intended to assist the user in analyzing the discovered data. The generated reports of analysis services 78 along with data from user-defined criteria may be used as input for recommendation services 80 to make recommendations for possible actions based on the analyzed data. Finally, the recommendations may be used as input for the user to decide which recommendations to execute in execution services 80, which provide a means of implementing and automating the recommended tasks.

In accordance with preferred embodiments of the present invention, discovery services 76 collect data inputs from a plurality of sources for internal data 30 and for external data 32, synthesizing the data to provide support for sourcing. Discovery services 76 also execute a plurality of functions for identifying and establishing rules, notices and alerts customized according to user-defined criteria. Accordingly, the functionalities of discovery services 76 focus not only on the collection and integration of internal data 30 and external data 32, but also on the presentation of that data to the user in graphical formats (e.g. charts, tables, etc.) and non-graphical formats (e.g. news, alerts, audio messages, etc.). The resulting data of discovery services 76 are then preferably reintegrated back into data mart 74.

The functionalities of discovery services 24 preferably include:

Extraction, transformation, loading and normalization/integration of internal data 30 and external data 32. Extract Transform Load (ETL) refers to software tools, which one of skill in the art will understand may be used in accordance with the present invention to extract data from a source data set, transform the data through a set of business and data rules, and load the data to a target data set.

Scanning of data, such as component data, which has been aggregated across the enterprise. For example, a user may trace the total amount spent on a particular component or the number of current suppliers for that component, which may be across different business units of the enterprise.

Real-time searching of data (e.g., components) and data sources (e.g., suppliers).

Customization of real-time alerts and news feeds.

In an alternate preferred embodiment, the functionalities of discovery services 76 may be separated as necessary into functionalities associated with discovery services and functionalities associated with alert services, respectively. After discovery services 76 execute one or a plurality of functions based on user-defined criteria, then the data are preferably transmitted or made available to analysis services 78.

In accordance with preferred embodiments of the present invention, analysis services 78 performs quantitative and qualitative analysis on the data results of discovery services 76 via a plurality of algorithms. Analysis services 78 may be customized based on user-defined criteria. For instance, a client may request risk analysis, involving applications associated with analysis services 78 to provide a plurality of analyses, such as model and forecast revenues based on inventory levels, demand forecasts, market pricing, availability of constituent parts, etc. Such analyses are functions of modules in VCI system 28 (which is described in more detail below); the modules implement a plurality of data and analysis tools, which offer solutions to domain-specific problems. Analysis services 78 thus examine and analyze a plurality of discovered data, such as contract terms, performance metrics, current inventories, surplus and shortages, warehouse locations, etc., and produce one or a plurality of reports based on the subsequently analyzed data. For example, internal data 30 and external data 32 may be analyzed by one or more modules to assess the impact or potential impact of internal data 30 and external data 32 on procurement decisions, sourcing decisions and/or strategic sourcing decisions in the enterprise with respect to one or more items. Accordingly, analysis services selects from one or more user-defined parameters for internal data 30 and external data 32 (i.e., allow user control over the parameters on which the analysis will be based), selecting values, value ranges, and/or conditions for the user-defined parameters, establishing weight(s) or relative weight(s) for the user-defined parameters, and/or prioritizing weight(s) or relative weight(s) for the user-defined parameters. In accordance with preferred embodiments, the resulting data of analysis services 78 are then preferably reintegrated back into data mart 74.

The functionalities of analysis services 78 are focused on providing the user with information and interpretations of the data, and preferably include:

Risk analysis.

Data visualization via graphs, charts, etc.

What-if scenarios. For example, a user may ask what the impact on margins will be if the price of a particular component goes up or down.

After analysis services 78 have run the integrated data through the algorithms based on the user-defined criteria, then the resulting data are preferably transmitted or made available to recommendation services 80.

In accordance with preferred embodiments of the present invention, recommendation services 80 collect analyzed data and user inputs about preferred constraint criteria in real time, and integrate it with current data in the databases and the data results of analysis services 78. Recommendation services 80 then preferably examine the analyzed data according to user-defined criteria (such as priorities and preferences) and make recommendations (such as what to buy, when to buy, how much to buy, from whom to buy, what to sell, when to sell, how much to sell, to whom to sell, etc.). Preferably recommendation services 80 apply a plurality of algorithms that optimize the analyzed data based on specific variables, such as price, quantity, time to delivery, client preferences, utility functions, business rules, etc. Recommendation services 80 then preferably run the data through its algorithms, making a recommendation or plurality of recommendations based on the resulting data, displaying it via a generated report or the user interface of VCI system 28. In accordance with preferred embodiments, the resulting data are then preferably reintegrated back into the data mart 74.

The functionalities of recommendation services 80 enable the user to define priorities, set parameters, and optimize outcomes based on those parameters. For example, a user may ask for a recommendation about how many components should be held in inventory and how many components should be allocated across divisions. After recommendation services 80 have determined recommendations based on user-defined criteria and parameters, then the resulting data is preferably transmitted or made available to execution services 82.

In accordance with preferred embodiments of the present invention, execution services 82 implement and automate the data results of recommended services 80 and recommend specific actions based on user-defined criteria. The user then preferably chooses to either set the automation features of execution services 82 to automatic mode, which automates all of the features and actions, or chooses to set the automation features to semi-automatic mode, which allows the user to automate some features and actions while not automating others (thus, automation levels of a first level, with a greater range of permitted automated action, or of a second level, with a more restricted range of permitted automated action, and perhaps additional levels, may be selected.) In addition, the user may chose to request that VCI system 28 generate a computer-readable output that can be fed into another system that initiate or effect action with that data. The functionalities of execution services 82 enable users to integrate VCI system 28 with other process-oriented ERP and SCM applications to pursue a plurality of actions. The functionalities of execution services 82 preferably include:

Providing agents that follow user-defined rules to enable hands-free handling of user-defined exceptions and processes.

Initiating a transaction via another application. For example, a user may initiate a transaction for purchasing a specific component from a specific vendor.

Carrying out certain transactions, such as generating and sending out a RFQ.

Changing information in an internal application. For example, a user may change the part number of a specified component in a Bill of Materials (BOM) after being alerted that the component is being discontinued.

In accordance with preferred embodiments, the resulting data is again reintegrated back into data mart 74, where it may be incorporated into the subsequent generation of historical data.

In accordance with preferred embodiments of the present invention, the data from discovery services 76, analysis services 78, recommendation services 80, and execution services 82 are respectively reintegrated into the data mart 74 at each step of the process. Thus, the resulting data is continuously incorporated into data mart 74 at predetermined or other intervals, so that the accumulated data preferably represents the synergistic state of a constantly growing and changing data mart.

Figure 5:
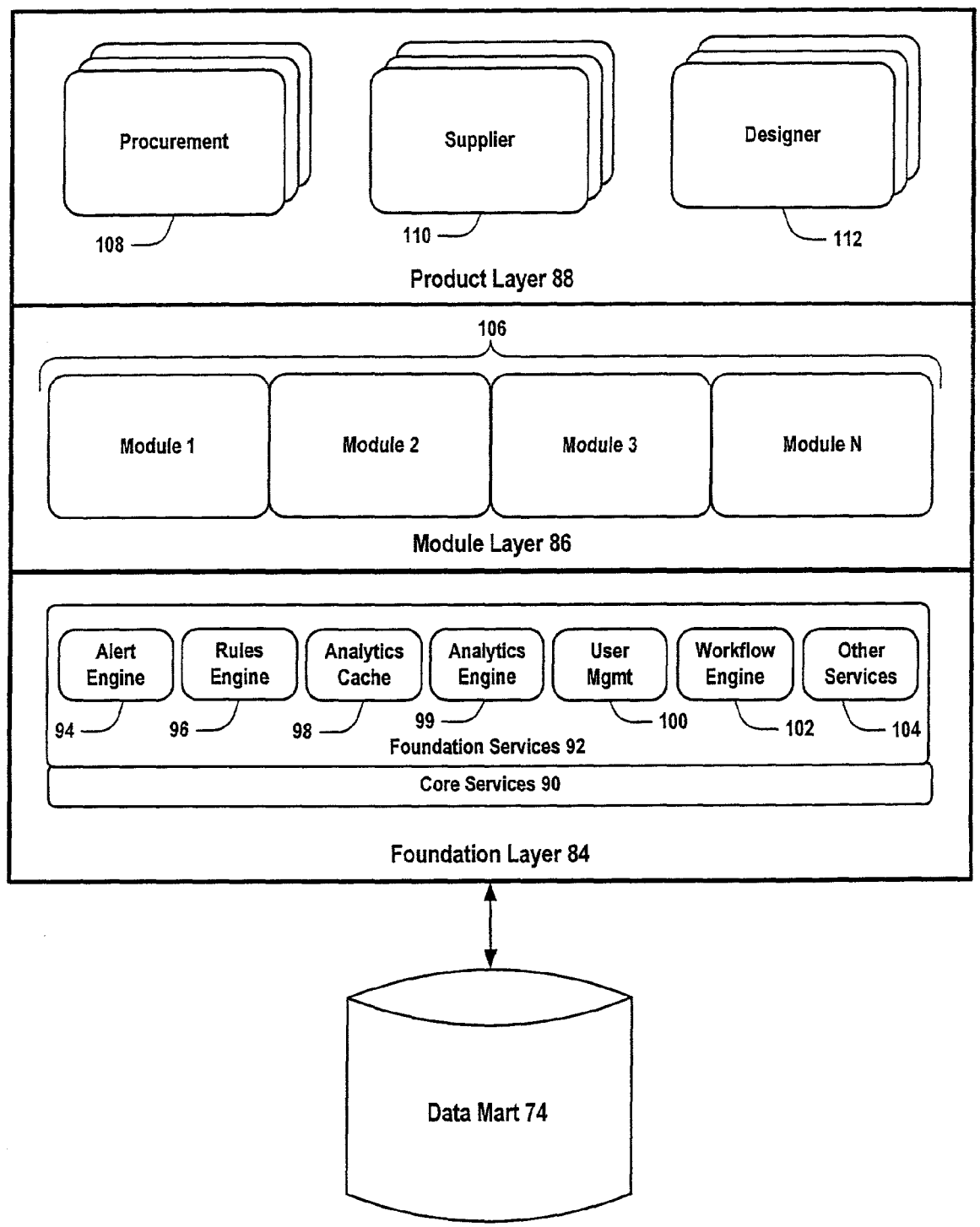
FIG. 5 is a high-level diagram illustrating exemplary embodiments of the application layers and components of a VCI system in accordance with preferred embodiments of the present invention.

FIG. 5 is a high-level diagram illustrating exemplary embodiments of application layers and components of VCI system 28. In preferred embodiments, VCI system 28 is comprised of three application layers: foundation layer 84, module layer 86, and product layer 88. Foundation layer 84 is a set of components that provides shared data and services for data integration, messaging, and a plurality of functions for modules 1-N 106 in module layer 86. Module layer 86 preferably resides on top of foundation layer 84 and contains a plurality of modules 1-N 106, which define specific domain functions. Product layer 88 integrates the functions of modules 1-N 106 in module layer 86, providing services in bundled combinations. Foundation layer 84, module layer 86 and product layer 88 are coupled to integrated internal and external databases (which are described in greater detail below).

In accordance with the present invention, foundation layer 84 preferably consists of a set of components that rely and interact with core services 90, and provide common data and services to foundation services 92. Foundation layer 84 is comprised of core services 90 and foundation services 92. Preferably all of the components on foundation layer 84, module layer 86, and product layer 88 may be installed and run locally within an enterprise or hosted outside the enterprise depending on the enterprise needs.

Core services 90 comprise the general services for managing and accessing the basic services and functionality of VCI system 28, including the underlying operating systems, servers, etc. that reside on the network. Core services 90 preferably include the following functionalities:

Diagnostics provide unified error handling, error messages, logging/tracing, exception handling.

Internationalization supports different character sets and languages.

Channel services support message passing using, for example, Java Messaging Service (JMS).

Scheduler executes tasks in user-defined intervals.

Object manager manages objects.

In accordance with the present invention, foundation layer 84 preferably also consists of foundation services components 92. Foundation services components 92 include: alert engine 94, rules engine 96, analytics cache 98, user management 100, workflow engine 102, and other services 104. Alert engine 94 preferably records and implements alerts that the user establishes in the user interface. Rule engine 96 is an engine for executing rule sets for automated or semi-automated execution. Analytics cache 98 preferably caches the results of the prior requests for analysis, so other users may share the resulting data. Since some data analysis may require a lengthy time period for execution, this component assists VCI system 28 by keeping the system from dedicating too many of its resources to re-executing similar analyses. Analytics engine 99 is an engine for performing analysis and optimization using a variety of mathematical techniques, such as linear programming, quadratic programming, constraint programming, etc. User management 100 manages the user access of user to services (i.e., via user password, etc.). Workflow engine 102 monitors the interaction of users with VCI system 28, iterates back and forth, manages state machine, and relates to implementing workflow process.

In accordance with the present invention, each module in module layer 86 preferably targets a specific domain and set of users (e.g., procurement and procurement professionals), identifies a specific set of questions, then provides functions and services in the form of actions that answer those questions. An "action" refers to any action or analytical task that can be implemented by the module, such as initiating a purchase, adding data to a database, performing a calculation, and notifying a user after an alert is triggered by e-mail, pager, etc. It is important to note that an "action" can be null, wherein there is no action other than the action having been triggered and accompanied by a notification to the user that the action has been triggered. Modules 1-N 106 in module layer 86 provide a plurality of data and analysis tools, which offer solutions to domain-specific problems, such as risk management, price forecasting, and supplier allocation. Each module in module layer 86 preferably consists of the following:

Specifications regarding what type of domain-specific data needs to be extracted and added to the data marts A set of analysis algorithms to address the domain-specific analyses A set of optimization algorithms to be able to provide domain relevant recommendations Specifications/rules for rules-driven automation agents Interfaces to other enterprise applications for feeding new data and requests to enterprise applications It is important to note that modules 1-N 106 leverage the components in foundation layer 84 to provide integrated functionality across VCI workflow process 73 (i.e., discovery services 76, analysis services 78, recommendation services 80, and execution services 82). Moreover, each module may be bundled with other modules in product layer 88 to provide integrated enterprise solutions, such as procurement product 108, supplier product 110, and designer product 112.

Accordingly, modules 1-N 106 in module layer 86 preferably include the following exemplary embodiments:

Data discovery module: This module preferably provides the user with access to an integrated view of pertinent information, which preferably includes internal data 30, external data 32, and integrated data based on computations of internal data 30 and external data 32. Data discovery module provides access to this data, so that a user may access, query, analyze and organize such data in a multitude of ways. All of the data are preferably stored in relational databases in datamart 74, organized for querying and report generation, and represented to the user in a plurality of formats, such as tables, lists, reports, etc.

In accordance with the present invention, exemplary embodiments of internal data 30 used by data discovery module preferably include:

Part numbers used inside an enterprise that may differ from part numbers used by a manufacturer, marketplace, etc.

Product BOMs that contain the parts

Purchase history (e.g., from purchase orders) of a part, plurality of parts, or family of parts, including such information as dates, quantities, price, lead time, on-time delivery, etc.

Company policies that relate to a part, plurality of parts, or family of parts, which may be in the form of documents Quality metrics for a given part, plurality of parts, or family of parts Current units in inventory for a given part, plurality of parts, or family of parts Current days of supply as forecast for a given part, plurality of parts, or family of parts Demand forecast or plurality of demand forecasts for a predetermined period of time (e.g., one day, one week, 30 days, 60 days, etc.) for a given part, plurality of parts, or family of parts Inventory target or plurality of inventory targets represented in a standard and/or predetermined unit of measurement (e.g., days of supply) for a given part, plurality of parts, or family of parts Percentage of deviation from a target or plurality of targets for a given part, plurality of parts, or family of parts Number of units to meet a target or plurality of targets represented in a standard and/or predetermined unit of measurement (e.g., thousands of units) for a given part, plurality of parts, or family of parts Contract availability for a given part, plurality of parts, or family of parts Contract commitment or commitments for a given part, plurality of parts, or family of parts Percentage of contracts fulfilled for a given part, plurality of parts, or family of parts Locations of any breakdowns in the production line Vendor Managed Inventory information Ownership status for a given part, plurality of parts, or family of parts Contract prices and other terms of a controlling contract for a given part, plurality of parts, or family of parts In accordance with the present invention, exemplary embodiments of external data 32 from product databases 62 used by data discovery module preferably include:

Manufacturers specifications of such parts, including the physical and functional attributes of each part and their values End of Life (EOL) information Class of equivalent parts for a part, plurality of parts, or family of parts Class of upgrade parts for a part, plurality of parts, or family of parts Standard industry categories for a part or plurality of parts Classes of parts that are equivalent to a part or plurality of parts for the purposes of certain specified applications Link or plurality of links to a manufacturer's data-sheet or data-sheets List of manufacturers for a part, plurality of parts, or family of parts In accordance with the present invention, exemplary embodiments of external data 32 from subscription sources 68, news sources 70, and other sources 72 used by data discovery module preferably include:

News stories relating to a part, its part family and the product category to which it belongs Preferably such news stories are categorized in the user interface of VCI system 28 in a product hierarchy, with each subcategory in the product hierarchy showing the stories (or links to the stories) that are relevant to the parts in that particularly category. Moreover, the news stories may preferably be searched, filtered, or organized in the user interface of VCI system 28 by date, geographic location, or according to the companies to which the news stories relate.

In accordance with the present invention, exemplary embodiments of external data 32 from and suppliers 60 and online marketplaces 66 used by data discovery module preferably include:

- Current and historical offering prices from online marketplaces and current and/or potential suppliers
- Possible delivery date if part or a plurality of parts are purchased, including location of supplier
- Location and/or locations that a part or plurality of parts may be shipped from
- Total net landed cost for a part or plurality of parts
- Current and past sales offers for a part or plurality of parts, including as-of date, price, quantity, lead-time, etc.

In accordance with the present invention, exemplary embodiments of data computed using extracted data points as input, plus an algorithm/method:

- A rating computed by VCI system 28 of how strategic a part or plurality of parts are for a customer
- User-defined definitions of equivalent parts
- Part numbers with mapping of internally used part numbers to manufacturers part numbers
- Indicative pricing for parts for which there are no current offerings in online marketplaces and current and/or potential suppliers, but for which VCI system 28 may compute a fair asking price
- Actual purchases resulting from functions and services of VCI system 28

It should be recognized that subsets of the aforementioned data of may be organized differently for different modules. For example, data may be organized according to external data only, internal data only, news only, parts only (with EOL, upgrades, downgrades, alternate parts, etc.), suppliers only with the parts they carry, etc.

Data alert module: This module preferably enables users to monitor vast amounts of data by identifying conditions for which they choose to be alerted. Such alert conditions preferably include any data accessed by the data discovery module and allow users to identify and implement actions based on specific variables. Alerts may be specified by a user who fully specifies the conditions that will trigger the alert. Alternatively, the user may select and/or further specify alerts from a list of alerts that VCI system 28 presents to the user via a user interface (which is described in more detail below). In accordance with the present invention, actions generated by VCI system 28 preferably include but are not limited to the following alert actions:

- Sending a notification by e-mail or sending a message to a phone, cellular phone, pager, etc.
- Invoking a module or plurality of modules from module layer 86 with partial or complete instantiation. It should be noted that automatic invocation and instantiation (i.e., specifying all or part of the input for performing a task with a module) may be the result of an alert that has been triggered, or may be the result of an event that VCI system 28 determines merits invocation of a module or plurality of modules.
- Invoking a module or plurality of modules from module layer 86 with or without instantiation and/or accompanied by a textual or other (e.g., mathematical) representation of an alert or plurality of alerts that caused the module to be invoked
- Invoking a module or plurality of modules from module layer 86 with or without instantiation and/or accompanied by a textual or other (e.g. mathematical) representation of the individual reasoning steps that caused the module to be invoked
- Adding data to data mart 74
- Adding data to any of the systems (i.e., data sources) that contain internal data 30
- Adding data to any of the systems (i.e., data sources) that contain external data 32
- Creating a new alert that may be automatically added to the list of alerts
- Creating a new alert that may be added to the list of alerts after the user's permission
- Generating a document that can be passed as input to any of the systems (i.e., data sources) that contain internal data 30
- Generating a document that can be passed as input to any of the systems (i.e., data sources) that contain external data 32
- Generating output in a format suitable for direct input to any of the systems (i.e., data sources) that contain internal data 30
- Generating output in a format suitable for direct input to any of the systems (i.e., data sources) that contain external data 32, or Thus, in accordance with the present invention alerts enable the user to monitor vast amounts of information by identifying conditions for which they choose to be alerted. Such conditions may range across any data of data mart 74.

In accordance with the present invention, alerts may have the following general form:

IF Condition THEN Action ELSE Action, where "Condition" is a logical expression that includes variables, values for such variables and operators, where "Variable" may be any of the data points contained in data mart 74, which originated from internal data sources 30 and/or external data sources 32. Operators may include any of the following: <, <=, >, >=, =, contains, start-with, ends-with, not equal functions, or logical operators (AND, OR, NOT).

An example of such a rule in English prose is:

IF (Contract_Price_of_Part_0023 >=Market_Price_of_Part_0023) AND (Forecast of_Part_0023 >=Inventory_of_Part_0023) THEN Generate a purchase order for Purchasing Inventory_of_Part_0023 at Market_Price_of_Part_0023 from the offering marketplace It should be noted that in accordance with the present invention an alert may be either an individual such rule, or sets of such rules that are meant to be computed and evaluated as a group. Moreover, when an alert is comprised of more than one rule, it is possible that a partial or complete ordering of such rules is possible, thus specifying precedence among multiple rules with respect to which rule is more important or should be invoked first in case of conflict. For example, if rules share the same "IF" condition but different "THEN" actions, it is possible to specify, which rule ought to take precedence if the "THEN" actions of the respective rules are in conflict.

It should also be noted that in accordance with the present invention any such action or sets of actions may be executed automatically or after a user's approval, or after approval of a subset of such actions. Furthermore the user might modify and/or enhance the action that the alert has triggered. Thus, alerts enable the user to monitor vast amounts of information by identifying conditions for which they choose to be alerted. Such conditions may range across any data of data mart 74.

It should be further noted that in accordance with the present invention alerts may be owned by either a single user, a class of users, or any arbitrary group of users. "Ownership" in this case refers to the ability to specify an alert, access the specification of an alert, modify the specification of an alert, share the alert of the specification with another user or plurality of users, or be the beneficiary of an alert (i.e., being the destination of the action that the alert caused).

Accordingly, alerts preferably reduce the latency period in decision-making by informing users of key events, such as component shortages, price shifts, supplier problems, and schedule changes in order to allow synchronization of component procurement and operations and inventory cost reduction. For example, when a production schedule changes for a particular model of a product, the change shows up as an alert to the user of VCI system 28. The user may choose to be notified of the model and with it the BOM for that particular model. Once the alert is triggered, a module, such as the component shortage module, flags the components for the model, and either refers to alternate suppliers or refers to alternate equivalent components. Users may also look at procurement lead-time for that model to determine whether the schedule change can be resolved by procuring from the same supplier, and/or procuring from a different supplier, and/or procuring an alternate component.

Strategic component identification module: This module preferably provides the user with the ability to identify which components are strategic and which components are tactical, helping the user focus on the most critical components. Strategic components are important to the operations and end product of an enterprise, whereas tactical components are less critical, easier to replace, and often not customized. The strategic component identification module creates a 'criticality rating' based on a predetermined scale, such as 1 to 10 or 1 to 100, which is derived from a plurality of variables, which may include any of the following:

Total spent on the part
Number of parts purchased
Cost per part
Revenue and profit impact of the part
BOM analysis to determine which products would be affected by a shortage of this part and how much revenue would be affected by such a shortage
Impact of the part as a percentage of total revenue
Impact of the part as a hard dollar opportunity cost per day
Length of lead time, wherein longer lead times imply higher criticality rating
Number of times the part stocked out over a predetermined period of time (e.g., one month, one quarter, one year, etc.)
Price volatility
Parts that are on allocation from the manufacturer and/or supplier
Rate of depreciation for the part The module preferably generates reports showing each of the variables by part or component (e.g. total spent in part class, cost per individual part, rate of depreciation per part, revenue impact per part, etc.). After all of the parts have been rated, the module then preferably allows users to select which parts to consider strategic and which tactical by defining a criticality rating threshold for each category. The selected parts are saved and used in subsequent analyses. Users then define different weights for each variable in the formula, thus customizing the formula.

Price forecasting module: This module preferably provides the user with recommendations for purchasing items from electronic markets by evaluating electronic market prices in real time depending on a plurality of enterprise-specific conditions, such as contract pricing for similar goods or the cost of carrying an inventory of the particular supply. The price forecasting module also enables the user to identify price thresholds based on pre-defined criteria, permitting the user to routinely troll electronic markets for potential opportunities, such as realizing savings based on purchasing additional parts from electronic markets, realizing savings based on selling excess inventory to electronic markets, etc. Moreover, this module allows the user to define a price and calculate optimized buying strategies based on input data.

Shortage risk management module: This module preferably enables the user to identify components that are shortage risks. The shortage risk management module highlights those components that have high-risk characteristics, suggesting ways to reduce the risk, and identifying 'stock out' warnings before the inventories reach that level. This module defines strategies for reducing risk, analyzes which parts have the largest forecast errors, analyzes where to use the allocated parts, finds additional sources for a part low in inventory, and generates alerts regarding this data. The shortage risk management module allows the user to focus on components with the highest risk levels or best cost savings opportunities within a BOM.

BOM optimization module: This module preferably identifies critical components in a BOM by evaluating price relative to the total BOM cost, current inventory levels, published EOL dates, length of lead time, frequency of the part in stock being out, etc. The BOM optimization module also allows the user to optimize the BOM for cost, delivery, quality, etc., by suggesting alternative components for the critical components in the BOM that have improved aforementioned characteristics. In addition, the BOM optimization module can enable the user to optimize components selected to be part of the BOM of a new product.

Supplier allocation module: This module preferably identifies and calculates the percentage of a business that should be allocated to each supplier. The supply allocation module provides the user with internal supplier ratings on quality, delivery, price, service, technology, etc., allowing the user to skew the ratings data as necessary. This module enables the user to identify the appropriate allocation to each supplier for each part depending on one or a prioritized combination of the aforementioned criteria. For example, a procurement organization will often need to allocate the purchase quantity across a set of suppliers. The supplier allocation module determines the optimal allocation of parts ordered across a set of suppliers based on criteria specified by buyers. Such criteria, for instance, may include: meeting contractual agreements; awarding the largest allocation to the supplier with the best performance rating; awarding a supplier based on quality performance or strategic technological importance; minimizing delivery risks; minimizing costs; etc. Moreover, different departments, such as a finance department, may also implement the supplier allocation module to determine the allocation of parts to maximize gross margin and/or revenues. Accordingly, this module addresses a plurality of constraints that affect the results of production schedules, desired inventory levels, contractual agreement or preset allocation, supplier's availability and costs, etc. In deriving an optimal solution, supplier allocation module uses data retrieved from enterprise databases (such as MRP systems 56), vendor databases, or marketplace databases to determine supplier ratings. In an alternate preferred embodiment, this module also accesses data entered by users or estimated by the application itself. For example, an overall performance rating may be determined by calculating a total score based on the weights of a plurality of performance ratings, such as technology, quality, delivery, cost, etc. Thus, ratings can be used to determine allocation quantities for each supplier, depending on any combination and ordering of the aforementioned criteria.

Inventory level optimization module: This module preferably optimizes inventory levels based on a comprehensive analysis of service-level requirements, inventory holding costs, warehouse constraints, etc. The inventory level optimization module determines optimal inventory levels considering service levels, inventory holding costs, warehouse constraints, etc., providing optimization analytics that identify a plurality of factors, such as unbalanced inventory levels for parts based on revenue impact of stock out risks. For each service level, this module shows inventory holding costs and revenue impact of stocking out of the product.

Sell excess inventory module: This module preferably identifies opportunities to sell excess inventories by evaluating current inventory levels, demand forecasts, spot market prices, etc. and identifying incipient surpluses based on trend analysis, predictive modeling, etc. In particular, situations where e-marketplace prices for components carried by the enterprise might present opportunities to sell excess inventory.

Component risk mitigation module: This module preferably identifies the critical components, calculates the cost of expediting or holding them in excess inventory, and determines the financial impact of various magnitudes of production change. The component risk mitigation module provides a means of mitigating when a supplier's inability to meet delivery commitments or unexpected changes in production volume (increase or decrease) lead to component shortage or excess.

Enterprise collaboration module: This module preferably provides the user with the capability of sharing information and collaborating on procurement activities with other users of VCI systems. The enterprise collaboration module allows users, such as product designers and procurement professionals, to share data and access to data, thus enabling them to collaborate on projects. For example, projects may include identifying alternative components with improved sourcing characteristics or alternative components with characteristics that result in greater optimal BOM characteristics.

It should be understood that, in accordance with the various alternative embodiments of the present invention, various modules 1-N 106 and combinations of modules 1-N 106 may be implemented and used in a manner to provide a desirable set of tools for the particular user and particular problem/task.

In accordance with the present invention, product layer 88 preferably is comprised of a combination of one or more modules 1-N 106 in module layer 86. Product layer 88 integrates functionalities by providing modules 1-N 106 in bundled combinations (i.e., procurement product 108, supplier product 110, designer product 112, etc.) to users as product offerings. For example, procurement product 108 addresses tactical problems in the supply chain by providing discovery, analysis, recommendation, and execution services on component availability, supplier performance, component prices, delivery history, etc. Thus, in an exemplary embodiment procurement 108 may include data discovery module, data alert module, strategic component identification module, and price forecasting module. The functionalities and services of bundled modules 1-N 106 are accessed via the user interface (as described in more detail below). Although a user may choose which module to use and decide on the input, VCI system 28 may proactively invoke one or more modules from module layer 86, with specific input and accordingly call the user's attention to the performance of a task with that module or modules.

Figure 6:
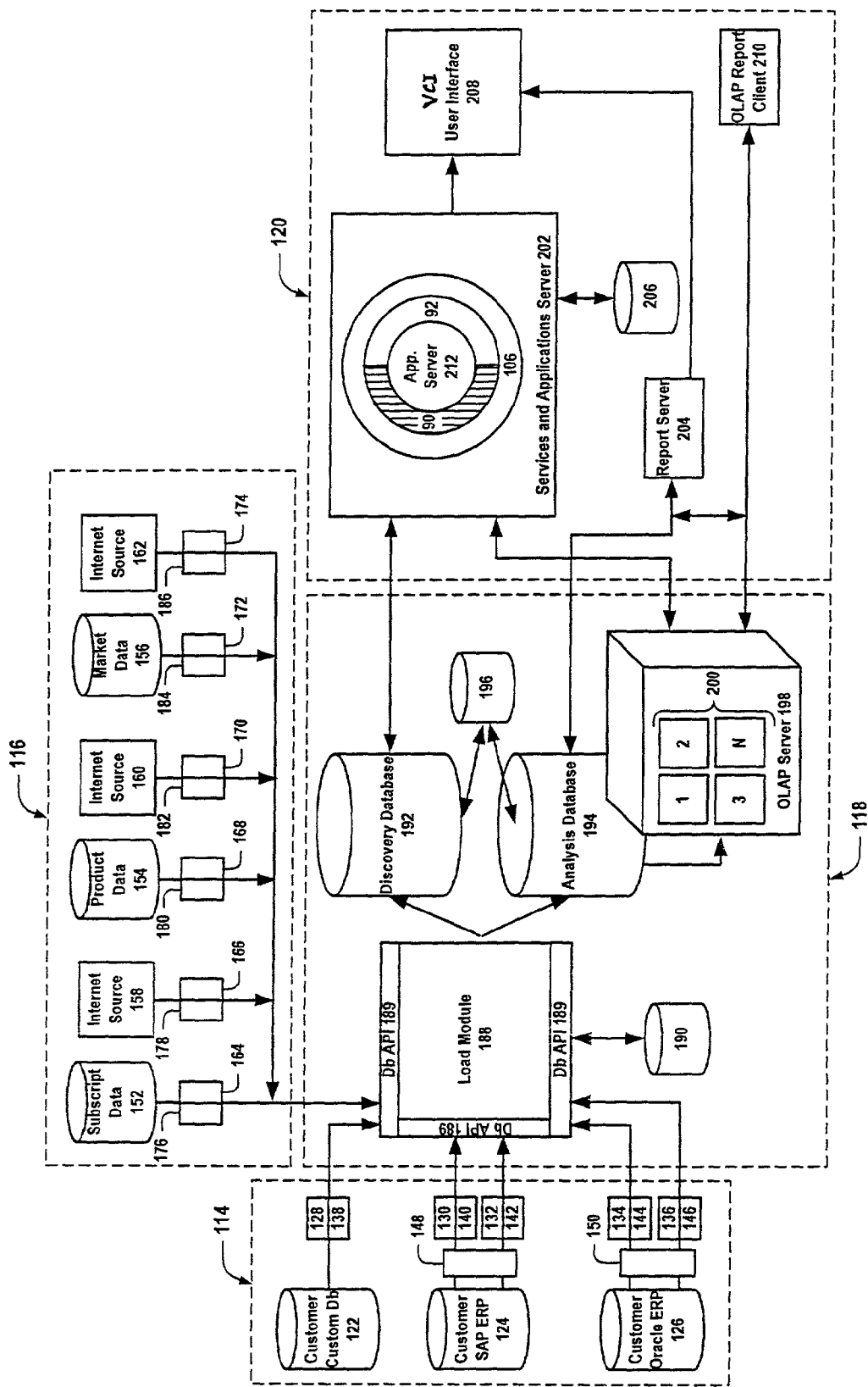
FIG. 6 is a high-level architectural diagram illustrating the hardware and software components of a VCI system in accordance with preferred embodiments of the present invention.

FIG. 6 is a high-level diagram illustrating preferred embodiments of the hardware and software components of VCI system 28. VCI system 28 preferably consists of four functional component blocks: internal data collection components 114, external data collection components 116, data integration components 118, and data application components 120. As illustrated in FIG. 6, internal data collection components 114 of VCI system 28 preferably consist of an internal data sources 122-126, extract modules 128-136, transform modules 138-146, and connectors 148-150. Internal data collection components 114 preferably are implemented at the customer's site, and extract and transform internal data 30 from a plurality of internal data sources, such as contract databases 46, ERP systems 54, SCM systems 56, etc. (as illustrated in FIG. 3A). Internal data collection components 114 are preferably implemented at the client's site and accordingly are coupled to a network, such as WAN, LAN, Internet, etc. In accordance with the present invention, the Internet connection may consist of a dial-up connection, private line, VPN, DSL, ISDN, T-1, etc.

In accordance with a preferred embodiment of the present invention, external data collection components 116 of VCI system 28 preferably consist of a plurality of external data sources 152-56, website sources 158-162, extract modules 164-174, and transform modules 176-186; the components of external data collection 116 preferably extract and transform external data 32 from a plurality of external data sources, such as product databases 64, online marketplaces 68, subscription sources 70, etc. (as illustrated in FIG. 3B). External data collection components 116 may be implemented at the client's site or hosted, depending on system requirements and customer needs.

In accordance with a preferred embodiment of the present invention, internal data collection components 114 and external data collection components 116 perform the extract and transform functions of the ETL process respectively. The extraction process of internal data collection components 114 and external data collection components 116 preferably is initiated by load module 188, by one of the extract modules (i.e., extract modules 128-136 or extract modules 164-174), or at the data source (i.e., internal data sources 122-126, external data sources 152-156, or website sources 158-162). For instance, in an exemplary embodiment, Customer Oracle ERP 126 of internal data collection components 114 may initiate the process of calling for internal data 30, or Oracle ERP extract module-1 134 may initiate this process, or load module 188 in external data collection components 114 may initiate this process. Likewise, in another exemplary embodiment, subscription database 152 may initiate the process of calling for external data 32, or subscription extract module-1 164 may initiate this process, or load module 188 may initiate this process. It should be noted that, in accordance with preferred embodiments, load module 188 along with the extract and transform modules in internal data collection components 114 and external data collection components 116 preferably function as integrated ETL tools.

Since the data must be mapped before it can be extracted by the extract and transform modules, a transformation has to be defined in the transform module for all data from each data source. As is known in the art, transformation is the process of mapping data from source objects onto target objects and optionally applying conversions to the data. After the transformations have been defined, then scripts are generated, which perform the function of converting and loading data into target objects at run time when so requested. Thus, a transform module, such as transform module 176, generates the scripts that perform the actual loading at run time. Nevertheless, load module 188 manages the process of loading by invoking the necessary scripts.

As further illustrated in FIG. 6, data integration components 118 consist of load module 188, database API 189, ETL metadata database 190, discovery database 192, analysis database 194, purge/archive module 196, OLAP server 198, and OLAP analysis cubes 1-N 200. Data integration components 118 provide the functionality of a load module and integrated data mart, whereby normalized data is loaded from a plurality of sources at different times and in different formats, and organized so that it is suitable for complex querying and analysis. Internal data 30 and external data 32 are placed in data integration components 118 in order to build applications for an integrated repository, such as a data mart. Load module 188 manages the process of loading, updating, and rebuilding discovery database 192 and analysis database 194. Both discovery database 192 and analysis database 194 are types of relational databases. The loading process triggers events in the OLAP server 198 that rebuilds OLAP analysis cubes 1-N 200. (OLAP refers to On-line Analytic Processing, which one of skill in the art will appreciate is a form of a multi-dimensional database.) OLAP server 198 conducts multi-dimensional queries and pivot table services through the use of OLAP analysis cubes 1-N 200, which preferably perform data aggregation on top of analysis database 194. Purge/archive module 196 manages the databases, so that data may be archived and purged as necessary. ETL metadata database 190 is an operational RDBMS that stores adapter and other information that is used and required by load module 188.

In accordance with the present invention, once the normalized data is written into discovery database 192 and analysis database 194, then the data is transmitted from analysis database 194, OLAP server 198, and OLAP analysis cubes 1-N 200 to data application components 120. In response to direct user requests or in order to process data that are needed to satisfy user requests, applications, such as modules, in services and application server 120 query analysis database 194 and OLAP database in data application components 120.

Data application components 120 consist of services and application server 202, report server 204, user metadata database 206, VCI user interface 208, and OLAP report client 210. All of the components in data application components 120, except for VCI user interface 208, may be hosted at the customer's site or at a central location remote from the customer's site. VCI user interface 208 is preferably viewed at the customer's site via a web browser. Services and application server 202 provides a plurality of functions based on the integrated services of foundation layer 84 and module layer 86 (as described in connection with FIG. 5). The functions of services and application server 202 and its constituent components (i.e., core services 90, foundation services 92, and modules 1-N 106) depend upon the integration of internal data 30 and external data 32, which is stored in discovery database 192 and analysis database 194, and simultaneously made available for analysis by OLAP analysis server 198. Services and application server 202 preferably transmits the integrated data to VCI user interface 208, which displays it in a plurality of formats based on user-defined inputs. In addition, VCI user interface 208 preferably represents the integrated data within the context of the workflow process described in FIG. 4. User metadata database 206 preferably is an operational relational database that contains metadata about the users and their access to VCI services and functions Services and application server 202 provides a plurality of functions based on the integrated services of foundation layer 84 and module layer 86 (as previously described in connection with FIG. 5). Services and application server 202 consists of application server 212, core services 90, foundation services 92, and modules 1-N 106.

Report server 204 receives analyzed data from analysis database 194 and OLAP server 198, and presents reports about the integrated data to the user via the web browser of VCI user interface 208. Data may be reported to the user in a plurality of report formats and methods (which are further described below).

Thus, in accordance with the present invention, internal data 30 is collected in internal data collection components 114, while external data 32 is simultaneously collected in external collection components 116. Both internal data 30 and external data 32 are normalized and transmitted to data integration components 118, where the aggregated data is stored into discovery database 192 and analysis database 194, and analyzed in OLAP server 198. The stored data is made available to services and application server 202 in data application components 120. Services and applications server 202 provides a plurality of functional applications that make decisions about VCI services, such as inventory levels, demand forecasts, contract commitments, spot market analysis, etc., based on the integration of internal data 30 and external data 32. Services and applications server 202 then sends the resulting data to the end user via VCI user interface 208. VCI user interface 208 displays the integrated data, facilitating the user in making strategic and tactical decisions.

Figure 7A:
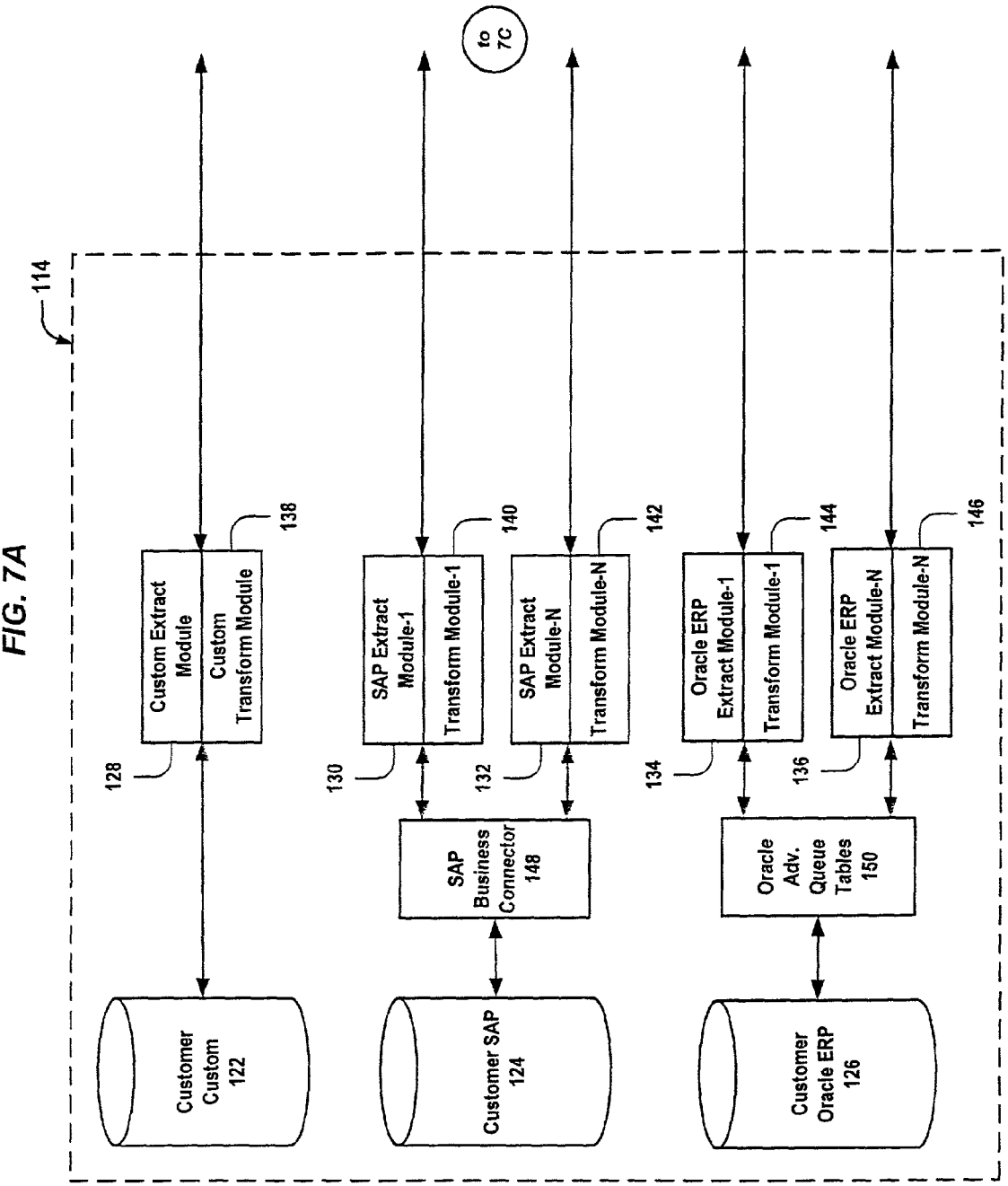
FIG. 7A is an architectural diagram illustrating the internal data collection components of a VCI system in accordance with preferred embodiments of the present invention.

FIG. 7A is an architectural diagram illustrating preferred embodiments of the internal data collection components 114 of exemplary VCI system 28. Internal data collection components 114 extract and transform internal data 30, such as contract terms, parts catalogs, JIT reports, supplier ratings, production schedules, etc., from a plurality of sources, such as custom customer databases, ERP systems, etc. Internal data collection components 114 preferably reside on the customer's system and are connected to the other components of VCI system 28 via network connections, such as dial-up connections, private lines, DSL, ISDN, T-1, etc. Thus, internal data 30 is preferably accessed across a network. Customer custom database 122 preferably is one or a plurality of relational database management systems (RDBMS) (e.g., Oracle 9*i* Database, Microsoft SQL Server, Informix Cloudscape, Sybase Adaptive Server Enterprise 12.0, etc.), whereas customer SAP ERP 124 and customer Oracle ERP 126, preferably are third party enterprise systems (e.g., Oracle e-business suite, SAP, J D Edwards Oneworld, BAAN ERP Purchasing, etc.), which may include ERP, SCM, MRP, etc. Internal data collection components 114 of VCI system 28 perform data extraction and transformation functions associated with ETL tools at a predetermined period of time, such as every 12 hours, 24 hours, etc., via one or a plurality of custom modules for data extraction and transformation. The extract and transform functions of internal collection components 114 are preferably located at the customer site and separated into one or a plurality of extract modules and one or a plurality of transform modules; the extract and transform modules respond to requests that may originate from the load module, the extract module, or the source (i.e., customer custom database 122, customer SAP ERP 124, customer Oracle ERP 126, etc.) (as further described in connection with FIG. 7C). It should be noted that internal collection components 114 may also be hosted at a central location remote from the customer's site.

In accordance with the present invention, customer custom database 122 contains a predetermined subset of internal data 30 from one source or a plurality of sources, such as suppliers' databases 42, contract databases 44, product quality databases 46, ERP system 52, etc. (as illustrated in FIG. 3A). It should be noted that in accordance with the present invention that customer custom database 122 represents generically any customer custom database, each of which is suitable for supplier data, contract data, product quality data, etc. Accordingly, the process of calling for internal data 30 is preferably initiated by load module 188, custom extract module 128, or custom customer database 122. For example, load module 188 may initiate a request to call a subset of internal data 30 from customer custom database 122 by transmitting a command to generate a request from custom extract module 128 via a network connection. Custom extract module 128 then sends the request to extract internal data 30 from customer custom database 122, which preferably responds to the request by sending a message containing the requested internal data to custom transform module 138. Custom transform module 138 aggregates internal data 30 and performs calculations on it to normalize the data into a format compatible with the schema in discovery database 192 and analysis database 194 in data integration components 118. Since internal data 30 may come from a plurality of sources, internal data 30 must be normalized to conform to the specific database schema in discovery database 192 and analysis database 194. Once internal data 30 is normalized by custom transform module 138, then the data-set is transmitted via load module 188 to discovery database 192 and analysis database 194. It is important to note that internal data 30 may be extracted simultaneously from a plurality of database sources and not just from a single customer custom database.

With reference to FIG. 7A, in accordance with the present invention, customer SAP ERP 124 contains a subset of internal data 30, such as from ERP systems 52 (as illustrated in FIG. 3A). Accordingly, the process of calling for internal data 30 is preferably initiated by load module 188, SAP extract module-1 130, or customer SAP ERP 124. For instance, SAP extract module-1 130 preferably initiates the request for a subset of internal data 30 by transmitting a request for data to customer SAP ERP 124. In order for SAP extract module-1 130 to request and receive internal data 30 in a compatible format from customer SAP ERP 124, SAP extract module-1 130 must access a standard Business Application Programming Interface (BAPI) on customer SAP ERP 124. Thus, SAP extract module-1 130 generates BAPI Java function calls to extract Java objects and sends requests to SAP business connector 148, preferably a platform-independent BAPI (i.e., TIBCO, Webmethods, Acta, Mercator, Neon, etc.), to extract specified internal data 30 from customer SAP ERP 124. SAP business connector 148 converts Java requests to BAPI calls to access customer SAP ERP 124. Customer SAP ERP 124 preferably responds by sending one or a plurality of messages containing internal data 30 to SAP Business Connector 148, which converts BAPI calls back into Java objects and sends internal data 30 formatted as Java objects to transform module-1 140. Transform module-1 140 then preferably aggregates and normalizes the Java-formatted data, so that the extracted internal data 30 conform to the specific schema in discovery database 192 and analysis database 194 in data integration components 118. Once the Java objects containing internal data 30 are normalized by transform module-1 140, they are sent to discovery database 192 and analysis database 194 via load module 188.

In accordance with preferred embodiments of the present invention, a request for a subset of internal data 30 formatted in eXtensible Markup Language (XML) may also be initiated by load module 188, customer SAP ERP 124, or SAP extract module-N 132 from customer SAP ERP 124. For example, load module 188 may transmit a command to generate a request from SAP extract module-N 132 via a network connection. In order for SAP extract module-N 132 to request and receive internal data 30 in XML from customer SAP ERP 124, SAP extract module-N 132 must access business connector 148 on customer SAP 124. SAP extract module-N 132 preferably generates and transmits one or a plurality of requests to SAP business connector 148 to extract specified internal data 30 formatted in XML from customer SAP ERP 124. SAP business connector 148 converts XML requests to BAPI calls to access customer SAP 124. Customer SAP ERP 124 preferably responds by sending one or a plurality of messages containing internal data 30 to SAP business connector 148, which converts BAPI calls back to XML documents and sends them to transform module-N 142. Transform module-N 142 aggregates and normalizes the XML-formatted data, so that extracted internal data 30 conforms to a format compatible with the schema in discovery database 192 and analysis database 194 in data integration components 118. Accordingly, after the XML documents containing internal data 30 are normalized by transform module-N 142, the XML documents containing internal data 30 are sent to discovery database 192 and analysis database 194 in via module 188.

As further illustrated in FIG. 7A, in accordance with the present invention, customer Oracle ERP 126 contains a subset of internal data 30, such as data from ERP system 52 (as illustrated in FIG. 3A). Accordingly, the process of calling for internal data 30 is again preferably initiated by load module 188, Oracle ERP extract module-1 134, or customer Oracle ERP 126. For example, Oracle ERP extract module-1 134 may initiate the process by sending a request for a subset of internal data 30 to customer Oracle ERP 126. In order for Oracle ERP extract module-1 134 to request and receive internal data 30 in a compatible format from customer Oracle ERP 126, Oracle ERP extract module-1 134 must extract data via PL/SQL calls from Oracle advanced queue tables 150, which maintain the messaging and queuing system for access and data extraction from Oracle ERP 126. Thus, Oracle ERP extract module-1 134 makes requests via PL/SQL calls to Oracle advanced queue tables 150 to extract specified internal data 30 from customer Oracle ERP 126. Oracle advanced queue tables 150 processes PL/SQL calls, then pulls internal data 30 from Oracle ERP 126. Oracle ERP extract module-1 134 then retrieves updated internal data 30 in XML format from Oracle advanced queue tables 150. Oracle ERP extract module-1 134 then sends internal data 30 formatted as XML documents to transform module-1 144, which preferably aggregates and normalizes the XML-formatted data, so that extracted internal data 30 conforms to the specific schema in discovery database 192 and analysis database 194. Once the XML documents containing internal data 30 are normalized by transform module-1 144, they are sent to discovery database 192 and analysis database 194 via load module 188.

In accordance with the present invention, the process of calling for internal data 30 is again preferably initiated by load module 188, Oracle ERP extract module-N 136, or customer Oracle ERP 126. For instance, load module 188 may initiate a request to call a subset of internal data 30 as Java objects from customer Oracle ERP 126 by sending a command to generate a request from Oracle ERP extract module-N 136 via a network connection. In order for Oracle ERP extract module-N 136 to request and receive internal data 30 in a compatible format from customer Oracle ERP 126, Oracle ERP extract module-N 136 must extract data via a Java Messaging System (JMS) compliant bus, such as Oracle Message Broker, Sierra Atlantic framework, etc., from Oracle advanced queue tables 150. Thus, Oracle ERP extract module-N 136 makes requests via JMS calls to Oracle advanced queue tables 150 to extract specified internal data 30 from customer Oracle ERP 126. Oracle advanced queue tables 150 issues JMS calls, then pull internal data 30 from Oracle ERP 126. Oracle ERP extract module-N 136 then retrieves internal data 30 in Java format from Oracle advanced queue tables 150. Oracle ERP extract module-N 136 then sends internal data 30 formatted as Java objects to transform module-N 146, which preferably aggregates and normalizes the Java-formatted data, so that extracted internal data 30 conforms to the specific schema in discovery database 192 and analysis database 194 in data integration components 118. Again, after the XML documents containing internal data 30 are normalized by transform module-N 146, they are sent to discovery database 192 and analysis database 194 via load module 188.

It should be noted that requests for internal data 30 may be initiated independently and simultaneously from a plurality of sources. For example, customer custom database 122 may begin the process of calling for a subset of internal data 30, while SAP extract module-1 130 may have already begun the process of calling for a subset of internal data 30 from customer SAP ERP 124 and load module 144 may also have already begun calling for a subset of internal data 30 from customer Oracle ERP 126. Thus, the process of requesting internal data 30 from any of the data sources that provide them, such as suppliers database 42, contracts database 44, product quality database 46, internal parts database 48, data mart 50, ERP systems 52, SCM systems 54, MRP systems 56, CRM systems 58, etc., is preferably initiated independently and/or simultaneously from a plurality of sources.

In accordance with the present invention, extract modules 128-136 preferably generate requests from ERP systems, such as customer SAP ERP 124 and customer Oracle ERP 126, which accordingly respond with a message or plurality of messages containing internal data 30 formatted as either an XML document, Java objects, or some other format. Therefore, extract modules can make calls to extract data in a variety of formats, depending on source and system requirements. Accordingly, internal data 30 preferably is received by transform modules as either streaming data or in a single query/response.

Since internal data collection components 114 have been described in conjunction with specific preferred and other embodiments, many substitutions, alternatives and variations will be apparent to those skilled in the art. For example, data sources for internal data 30 include more than ERP systems, such as SCM systems 54, MRP systems 56, CRM systems 58 etc. Accordingly, the type of business connector as well as the extract and transform modules for such data sources will change depending on the type and format of the data. In addition, for example, data sources for internal data 30 include all kinds of customer custom databases, such as suppliers' databases 42, contracts databases 44, product quality databases 46, internal parts databases 48, data marts 50, etc. Thus, the invention is intended to embrace all of the alternatives and variations that fall within the spirit and scope of the invention.

Figure 7B:
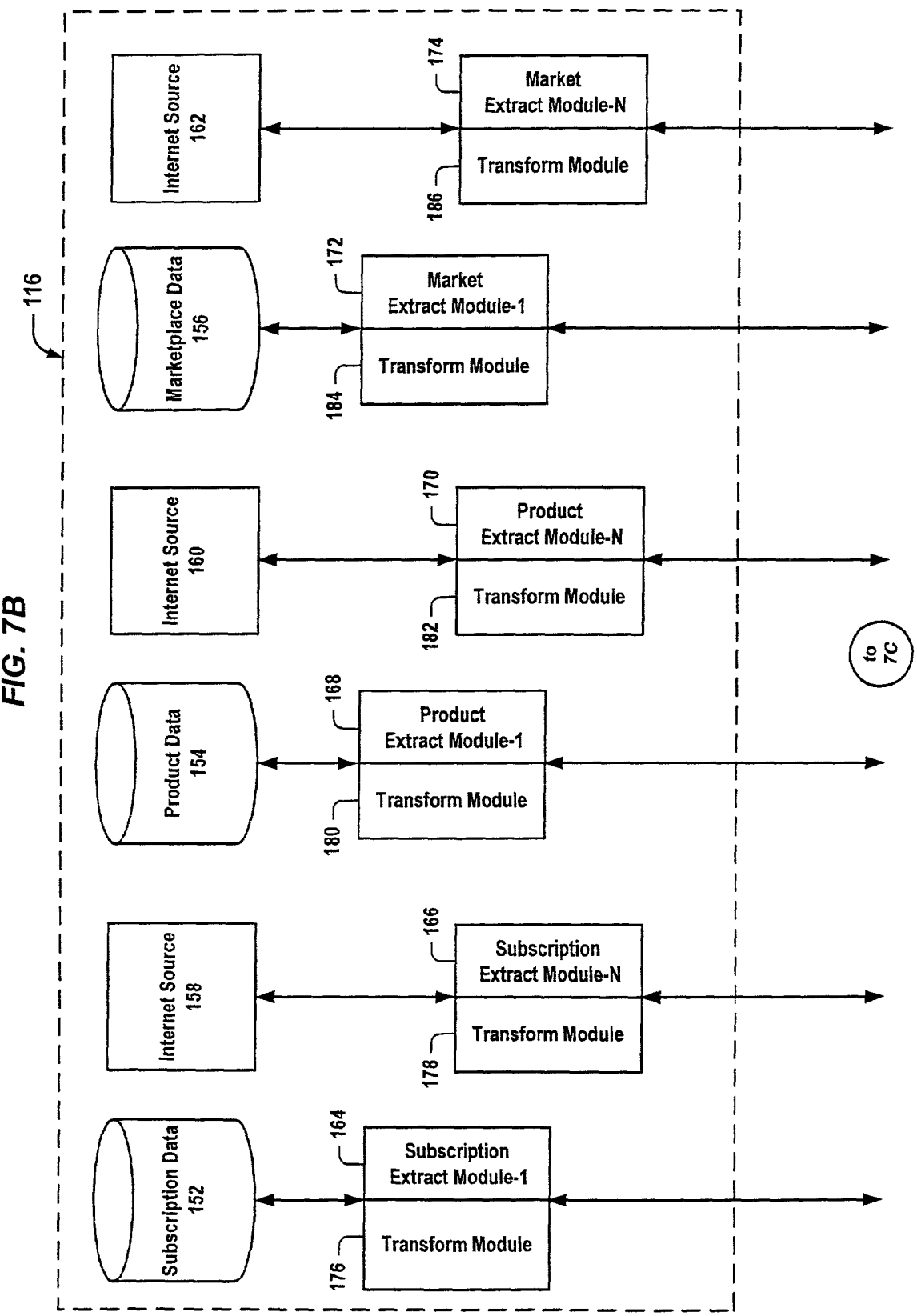
FIG. 7B is an architectural diagram illustrating the external data collection components of a VCI system in accordance with preferred embodiments of the present invention.

FIG. 7B is an architectural diagram illustrating preferred embodiments of the external data collection components 116 of exemplary VCI system 28. External data collection components 116 search, extract and transform external data (i.e., part catalogs, prices, availability, lead time, compatible parts, specifications, etc.) from a plurality of sources of external data 32, such as databases and Internet sources. External data 32 may be received across a network similar to how internal data 30 is received, but external data 32 may also be received in a plurality of other formats, such as via CD-ROM, ZIP disk, floppy disk, catalog (in hard copy), brochure (in hard copy), etc. Databases, such as subscription database 152, product database 154, and marketplace database 156, preferably contain external data 32 from one source or a plurality of sources. External data sources, such as Internet sources 158-162, preferably contain external data 32, which may be extracted from one or a plurality of web sites, depending upon data requirements and user requests. External data collection components 116 of VCI system 28 is comprised of a plurality of Internet sources 158-162, subscription database 152, product database 154, marketplace database 156, a plurality of extract modules 164-174, and a plurality of transform modules 176-186.

In accordance with the present invention, subscription database 152 is preferably a database containing subscription news and information (i.e., supplier ratings, news bulletins, market reports, etc.). News stories from subscription database 152 or from Internet source 158 are preferably organized according to a product hierarchy, such as electronic components/memory/SDRAM.

In accordance with the present invention, product database 154 is preferably a partner database containing product information (such as a product catalogs, specifications, wholesale prices, etc.). For example, external data 32 from product database 154 may include a hierarchy of product categories, detailed part numbers for each product in a product family or category, detailed lists of attributes (i.e., specifications) and values for attributes for each product in a product family or category, etc. Such specifications are generally based on published information. The providers of the product databases frequently provide upgrades and downgrades for each part, end-of-life (EOL) information about which parts will be discontinued, part equivalence information about how a product can be replaced, etc. VCI system 28 preferably enhances the equivalence information when necessary.

In accordance with the present invention, marketplace database 156 is preferably a database for a public exchange or auction containing product and market information (i.e., parts, manufacturer, compatible parts, prices, availability, etc.), or a partner with a database for a private exchange or online marketplace containing product and market information. For example, external data 32 from market database 156 may include electronic market prices from a private exchange with prices that are different than the previously negotiated contract prices made by an enterprise customer of a VCI system for a compatible product from a supplier.

Preferably external data collection components 116 perform conventional data extraction and transformation functions associated with ETL tools at predetermined periods of time, such as every 12 hours, or at required intervals, depending upon information needs and user requests, via one or a plurality of custom modules for data extraction and transformation, such as subscription extract module-1 164, transform module 176, subscription extract module-N 166, etc. The extract and transform functions of external data collection components 116 are preferably separated into one or a plurality of extract modules and one or a plurality of transform modules; the extract and transform modules respond to requests that may originate from the load module, the extract module, or the source (i.e., subscription database 152, Internet source 158, product database 154, etc.) (as further described in connection with FIG. 7C). It should be noted again that external data sources are not necessarily databases, and thus internal data 30 may be encoded in any format suitable for representing structured or semi-structured data, such as flat files (CSV, etc.), spreadsheets, etc.

In accordance with the present invention, subscription database 152 is a database containing subscription news and information. Preferably the process of calling for a predetermined subset of external data 32 is accordingly initiated by load module 188, subscription extract module-1 164, or subscription database 152. For example, load module 188 may initiate a request to call a subset of external data 32 from subscription database 152 by transmitting a command to generate a request to subscription extract module-1 164 via an Internet connection, which may be a dial-up connection, private line, DSL, ISDN, T-1, etc. Subscription extract module-1 164 transmits the request to extract a subset of external data 32 (preferably formatted in either XML, Java, SQL, etc.) to subscription database 152, which preferably responds by sending a message containing the requested external data 32 to transform module 176. Transform module 176 aggregates external data 32 and performs calculations on it to transform the data into the specific schema of discovery database 192 and analysis database 194 in data integration components 118. After external data 32 is normalized by transform module 176, then transform module 176 sends external data 32 to discovery database 192 and analysis database 194 via load module 188.

With reference to FIG. 7B, in accordance with the present invention, product database 154 is a partner database containing product information. Preferably the process of calling for external data 32 is accordingly initiated by load module 188, product extract module-1 168, or product database 154. For example, product database 154 preferably initiates the request for a subset of external data 32 by transmitting a message containing external data 32 to transform module 180. Transform module 180 then aggregates external data 32 and performs calculations on it to transform the data into the specific schema of discovery database 192 and analysis database 194 in data integration components 118. Once external data 32 is normalized by transform module 180, then transform module 180 sends external data 32 to discovery database 192 and analysis database 194 via load module 188.

In accordance with preferred embodiments of the present invention, marketplace database 156 is a database for a public exchange or auction containing product and market information. Preferably the process of calling for external data 32 is accordingly initiated by load module 188, market extract module-1 172, or market database 156. For example, market extract module-1 172 preferably initiates the request for a subset of external data 32 by transmitting a request to extract external data 32 (preferably formatted in either XML, Java, BAPI, SQL, etc.) to marketplace database 156. Marketplace database 156 preferably responds to the request by sending a message containing the requested external data 32 to transform module 184. Transform module 184 aggregates external data 32 and performs calculations on it to transform the data into the specific schema of discovery database 192 and analysis database 194. After external data 32 is normalized by transform module 184, then transform module 184 sends external data 32 to discovery database 192 and analysis database 194 via load module 188.

As further illustrated in FIG. 7B, in accordance with the present invention, VCI system 28 preferably implements a web extraction application, which may be used to search and extract HTML, XML, other web page formatting data from web pages to access external data 32 in real time. Internet sources 158-162 preferably consist of a plurality of web sites that contain a plurality of external data 32, such as specifications, part descriptions, product reviews, news, reports, etc., and serve as sources for searching and extracting non-proprietary data. Extract modules 166, 170 and 174 of external data collection components 116 may be located at the data source or on a server of VCI system 28. Moreover, extract modules 166, 170 and 174 may be either third party extraction tools or custom extraction tools.

In accordance with the present invention, the process of calling for external data 32 is preferably initiated by load module 188, subscription extract module-N 166, or market database 156. Load module 188 of data integration components 118 preferably initiates a request to extract external data 32 from Internet source 138, which may be subscription and non-subscription news and information sources, etc., by sending a command to extract module-2 204 coupled to Internet connection 203. Extract module-2 204, which may be a third party or custom extraction application, searches Internet source 138 via Internet connection 203 and extracts a plurality of external data 32, which may be available in a variety of formats, such as HTML, XML, PDF, etc. Extract module-2 204 preferably transmits external data 32 to transform module 205, which aggregates external data 32 and performs calculations on it to transform the data into the specific schema of discovery database 192 and analysis database 194. Once external data 32 is normalized by transform module 205, then transform module 205 sends external data 32 to discovery database 192 and analysis database 194 via load module 188.

As further illustrated in FIG. 7B, in accordance with the present invention, load module 188 preferably initiates a request to extract external data 32 from Internet source 140, which may be product information, specifications, news, etc., by sending a command to extract module-2 212 coupled to Internet connection 211. Extract module-2 212, which may be a third party or custom extraction application, searches Internet source 138 via Internet connection 211 and extracts a plurality of external data 32 which may be available in a variety of formats, such as HTML, XML, PDF, etc. Extract module-2 212 preferably sends external data 32 to transform module 213, which aggregates external data 32, so that extracted external data 32 conforms to a format compatible with the schema in discovery database 192 and analysis database 194 in data integration components 118. Once external data 32 is normalized by transform module 213, then transform module 213 sends external data 32, which may have been originally formatted in HTML, XML, PDF, etc., to load module 188 in data extraction components 116.

In accordance with the present invention, load module 188 preferably initiates a request to extract external data 32 from Internet source 142, which may be market information, prices, specifications, lead times, etc., by sending a command to extract module-2 220 coupled to Internet connection 219. Extract module-2 220, which may be a third party or custom extraction application, searches Internet source 142 via Internet connection 219 and extracts a plurality of external data 32 which may be available in a variety of formats, such as HTML, XML, PDF, etc. Extract module-2 220 preferably sends external data 32 to transform module 221, which aggregates external data 32, so that extracted external data 32 conforms to a format compatible with the schema in discovery database 192 and analysis database 194 in data integration components 118. Once external data 32 is normalized by transform module 221, then transform module 221 sends external data 32, which may have been originally formatted in HTML, XML, PDF, etc., to load module 188 in data extraction components 116.

It is important to note that external data 32 may be extracted simultaneously from a plurality of databases, i.e., subscription database 132, product database 134, and marketplace database 136. Thus, load module 188 preferably initiates requests to call external data 32 simultaneously from a plurality of sources by generating a plurality of requests from specified extract modules, such as subscription extract module-1 198, subscription extract module-204, product extract module-1 206, etc. Moreover, extract modules generate requests for external data 32, which may be formatted in XML, Java, BAPI, SQL, etc., which in turn respond with messages containing external data 32 in any of the aforementioned formats. For example, a request is made in Java and the returned results may be in XML.

In addition, external data 32 is preferably received by transform modules 176-186 as either streaming data or in a single query/response. Therefore, external data 32 may take the form of batch updates or real-time updates, depending on the nature of the request and response.

It is also important to note that in accordance with the present invention, the extract and transform functions of external data extraction components 116 may preferably be implemented simultaneously or independently at one or a plurality of data sources. Thus, a subset of external data 32 may be searched and extracted from a single data source, whether a database or an Internet source, by more than one extract module. For example, in a preferred embodiment, product extract module-1 206 may search for external data 32, such as product pricing, specifications, etc., at product database 134, while extract module-2 212 is simultaneously searching the conjoining web site of product database 134 for alternative external data 32, which may be not be present in product database 134. Moreover, external data 32 may be searched and extracted from multiple data sources simultaneously by more than one extract module. For instance, product extract module-1 206 may search external data 32 from product database 134, while subscription extract module 1-198 is searching subscription database 132 for external data 32 and marketplace extract module-1 is extracting external data 32 from marketplace database 136.

Since external data collection components 116 have been described in conjunction with specific preferred and other embodiments, many substitutions, alternatives and variations will be apparent to those skilled in the art. For example, data sources for external data 32 may include other databases and Internet sources, such as suppliers 60, electronic catalogs 64, news sources 70, etc. Additionally, data sources for external data 32 may be in any format suitable for representing structured or semi-structured data, such as flat files (CSV, etc.), spreadsheets, XML files, real time feed, etc. A similar ETL process as described above is applied to external data 32 that are encoded in the aforementioned formats. Thus, the invention is intended to embrace all of the alternatives and variations that fall within the spirit and scope of the invention.

Figure 7C:
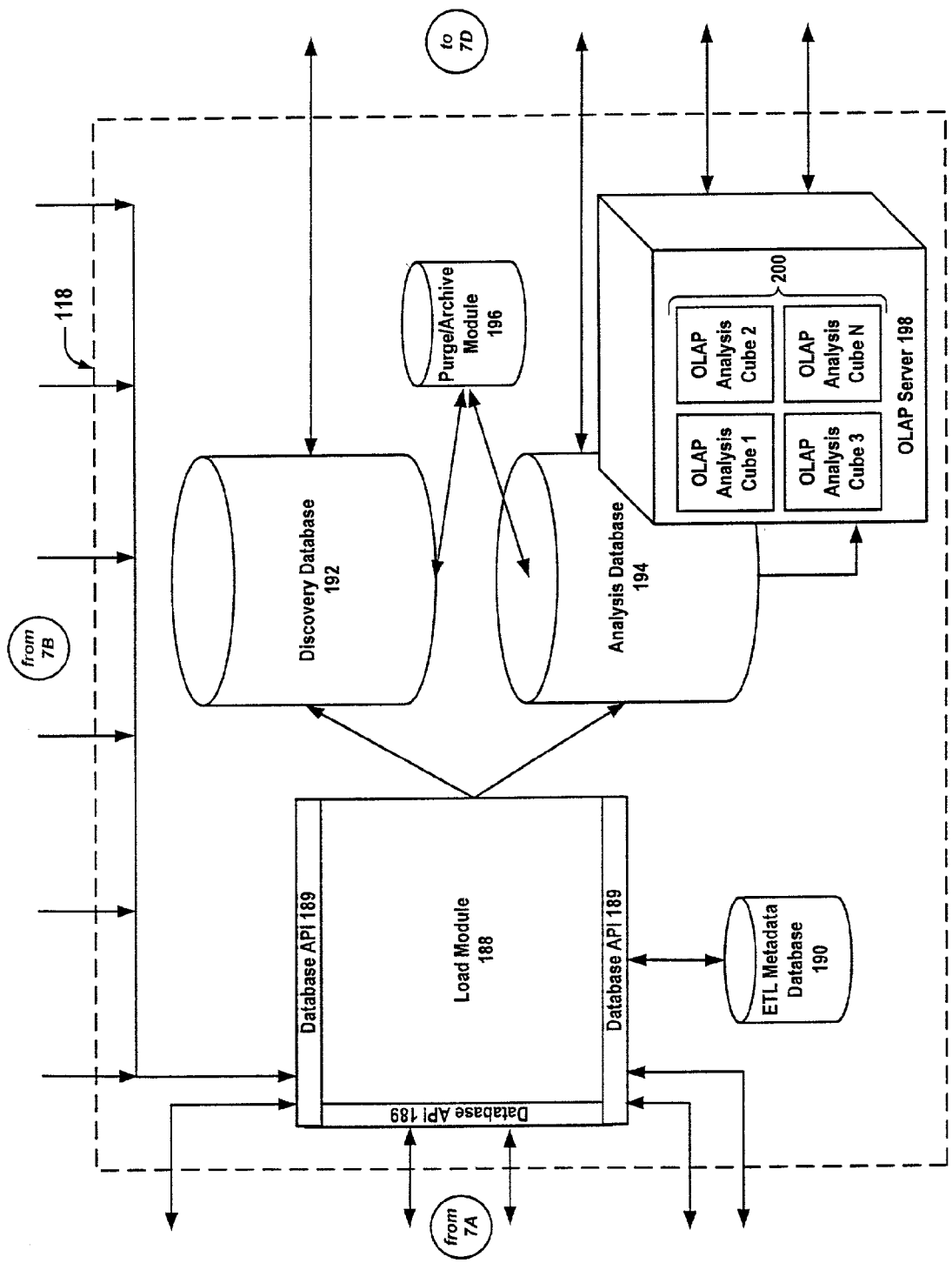
FIG. 7C is an architectural diagram illustrating the data integration components of a VCI system in accordance with preferred embodiments of the present invention.

FIG. 7C is an architectural diagram illustrating data integration components 118 of exemplary VCI system 28 in accordance with preferred embodiments of the present invention. As noted earlier, data integration components 118 provide the functionality of a load module, which preferably loads internal data 30 and external data 32 from a plurality of sources, and an integrated data mart, which preferably stores this data for complex querying and analysis. Data integration components 118 are comprised of load module 188, database APIs 189, ETL metadata database 190, discovery database 192, analysis database 194, purge/archive module 196, OLAP analysis server 198, and OLAP analysis cubes 1-N 200. The primary load functions of data integration components 118 are preferably handled by load module 188, whereas the primary data storage and analysis functions of data integration components 118 are preferably executed by discovery database 192, analysis database 194 and OLAP analysis cubes 1-N 200. It should be noted that internal data 30 and external data 32 are placed in data integration components 118 in order to build applications for module layer 86 and product layer 88.

As noted previously, load module 188 loads internal data 30 from internal data collection components 114 and external data 32 from external data collection components 116, and depending on the type of data, loads this data into discovery database 192 and analysis database 194. Since it is loading data from multiple sources and multiple destinations, load module 188 must identify the appropriate destination for internal data 30 and external data 32. Load module 188 maps the data from a plurality of sources via transform modules to the proper database structures (tables, etc.) For example, XML data may transformed and stored in relational tables of analysis database 194. Furthermore, load module 188 is coupled to a plurality of database APIs 189, which communicate with discovery database 192 and analysis database 194. Extract and transform modules preferably generate code in a standard database language, such as PL/SQL, etc., which calls the database API in order to perform the task of loading. Loading can be executed in batch, in single sequence, in serial and in parallel from multiple sources. Moreover, load module 188 performs incremental and complete loading of internal data 30 and external data 32 in parallel. For example, incremental loading occurs when existing data are modified or when new data are added; complete loading occurs when data are initially loaded into the databases.

In accordance with the present invention, load module 188 receives normalized internal data 30 from internal data collection components 114 and normalized external data 32 from external data collection components 116, so that the normalized data conforms to the specific schema in discovery data database 192 and analysis database 194. Load module 188 then preferably directs internal data 30 and external data 32 to the appropriate destination based on the schema in discovery database 192 and analysis database 194. Load module 188 processes the request and invokes the correct loader for the database depending on information in the data, and invokes the execution of action. Tables in load module 188 are used to examine data for the many actions that it must take. Mapping data is stored in ETL metadata database 190. Load module 188 determines when to put the data, where to put them, when to apply mappings, etc., and executes these actions in batch, in single sequence, in serial, in parallel, etc.

It should be noted that data integration components 118 of VCI system 28 preferably include only one load module 188. The location of the data is defined in standard database language, such as PL/SQL, but in order to execute the process load module 188 must call database APIs 189. Load module 188 preferably serves as a central location for controlling the loading and updating of a multitude of data in the database, and thus separates the database design from the act of loading. In other words, developers do not have to manage the data and thus be concerned with when and how to access data, but instead may simply write to the API.

In accordance with the present invention, ETL metadata database 190 is a RDBMS (Relational Database Management System) that stores a registry of adapters and other data used and required by load module 188. Metadata database 190, for example, assists in analyzing changes in database tables, tracking individual data elements, and building the data mart.

In accordance with the present invention, discovery database 192 and analysis database 194 are types of relational databases. Although both internal data 30 and external data 32 may be loaded into discovery database 192 and analysis database 194, the data preferably is distributed between the two databases, depending on which data must be used for report generation and OLAP analysis. The data stored in discovery database 192 is preferably mirrored in analysis database 194, and thus contains the same information but is aggregated and organized in a different format. In other words, the source data is the same, but it is arranged in a different way and for different reasons. Preferably partial replication of data occurs in discovery database 192.

Accordingly, discovery database 192, which as noted is a relational database system (such as Oracle 8*i*, etc.), receives one copy of the data and makes them available for Online Transaction Processing (OLTP). Data in discovery database 192 is then accessed through relational queries. Analysis database 194 is also a relational database system (such as Oracle 8*i*, etc.), but is organized as an OLAP star schema database. The data is also accessed by relational queries. OLAP star schema is a de-normalized schema more suitable for OLAP than OLTP. The data stored in analysis database 194 is also preferably mirrored in discovery database 192 and contains the same information organized differently. Like discovery database 192, the source data in analysis database 194 is the same, but arranged in a different way and for different reasons. As with discovery database 192, preferably partial replication of data occurs in analysis database 194.

Purge/archive module 196 preferably manages discovery database 192 and analysis database 194, so that data may be either stored in an archive or purged from a database as necessary. For example, obsolete data may be purged from database files after a pre-determined period of time, such as two years; relevant data, on the other hand, may be stored and transferred to a separate archival database after a pre-determined period of time.

In accordance with the present invention, the loading process of load module 188 may trigger an event in one or a plurality of OLAP analysis cubes 1-N 200 on OLAP server 198. OLAP server 198, such as MS OLAP Server, contains OLAP analysis cubes 1-N 200. The primary functionality of OLAP server 198 is to conduct multi-dimensional queries and pivot table services through the use of OLAP cubes. OLAP server 198 queries OLAP analysis cubes 1-N 200 to generate OLAP reports. OLAP analysis cubes 1-N 200 preferably consist of a plurality of OLAP analysis cubes, with each cube defining the dimensions of specific sets of data and serving as a source for a plurality of different reports across the specified dimensions. For example, one module of modules 1-N 106 (as described in connection with FIG. 5) may ask multi-dimensional queries or Pivot table services of OLAP analysis cubes 1-N 200. In accordance with the present invention, OLAP analysis cubes 1-N 200 preferably perform data aggregation on top of analysis database 194 with possible partial or complete data replication of the OLAP star schema database.

Thus, internal data 30 and external data 32 have been integrated and loaded into a single repository, organized for both OLTP and OLAP databases, so that modules 1-N 106 can query the databases as necessary for data discovery, analysis, and report generation. After the normalized data is written into discovery database 192 and analysis database 194, then the data is made available to data application components 120.

The functions of internal data collection components 114, external data collection components 116 and data integration components 118 are decoupled from data application components 120. This architectural design provides several advantages. The decoupling of data application components 120 from the other components facilitates the developer in designing the software. For example, the developer does not have to be concerned with the task of each component. From the developer's point of view, the developer of data application components 120 does not have to address where the data is coming from and how the data is aggregated and normalized in order to be made available for relational and multidimensional queries. Likewise, the developer of data integration components 118 does not have to address where and when the data is going and how it is being used. With architectural designs that require coupling, the developer must format complex queries to access data every time data is needed.

Figure 7D:
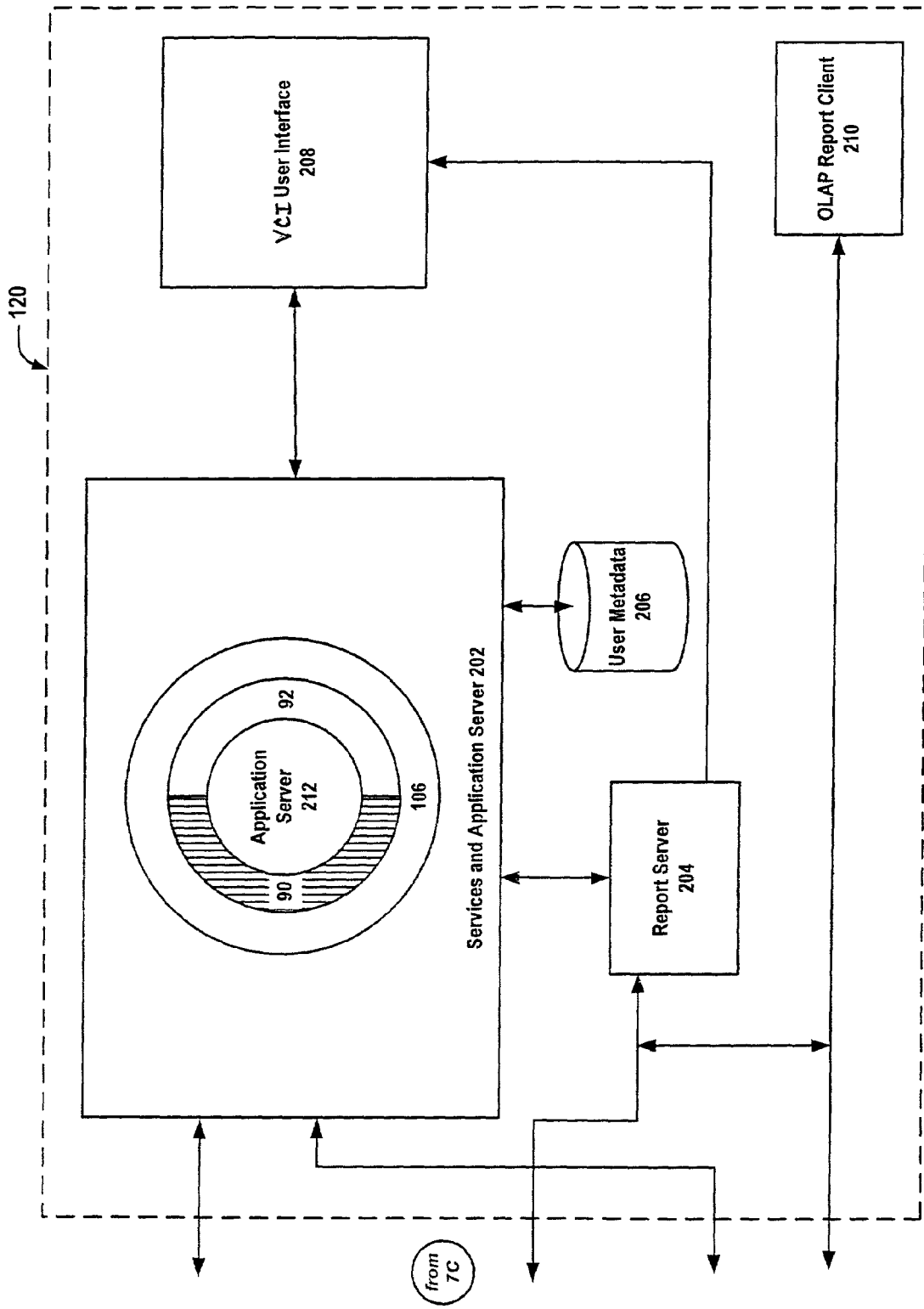
FIG. 7D is an architectural diagram illustrating the data application components of a VCI system in accordance with preferred embodiments of the present invention.

FIG. 7D is an architectural diagram illustrating a preferred embodiment of the data application components of an exemplary VCI system. Data application components 120 of VCI system 28 provide core and enterprise-specific application services for VCI system 28; such components integrate and run algorithms based on integrated data from discovery database 192, analysis database 194, and OLAP analysis cubes 1-N 200. Data application components 120 consist of services and application server 202, report server 204, user metadata database 206, VCI user interface 208, and OLAP report client 162. All of the components in data application components 120, except for VCI user interface 208, may be implemented at either the customer's site or at a central location remote from the customer's site. VCI user interface 208 is preferably implemented via a web browser at the customer's site. Services and application server 202 provides a plurality of functions based on the integrated services of foundation layer 84 and module layer 86 (as previously described in connection with FIG. 5). The functions of services and application server 202 depend upon the integration of internal data 30 and external data 32, which are stored in discovery database 192 and analysis database 194, and analyzed in OLAP analysis cubes 1-N 200 (as described previously in connection with FIG. 7C).

In accordance with the present invention, services and application server 202 provides a plurality of integrated functions and services to the user of VCI system 28. Services and application server 202 consists of application server 212, core services 90, foundation services 92, and modules 1-N 106. Application server 212, such as BEA WebLogic, IBM WebSphere, etc., is a server that manages the resources for the integrated functions and services of services and application server 202. Core services 90 preferably is comprised of the services for managing and accessing the basic services and functionality of VCI system 28, including the underlying operating systems, servers, etc. that reside on the network. Foundation services 92, as noted above, provide shared data and services for data integration, messaging, and a plurality of functions for modules 1-N 106. In accordance with the present invention, foundation services 92 rely upon and interact with core services 90 to provide common data and services to modules 1-N 106. Modules 1-N 106 provide a plurality of data and analysis tools, which offer solutions to domain-specific problems. Thus, services and application server 202 provides a plurality of functions derived from the services of foundation layer 74 and module layer 76.

In accordance with the present invention, report server 204 receives analyzed data from analysis database 194 and OLAP server 198 in data integration components 118, and presents reports about the integrated data to the user via the web browser of VCI user interface 208. Data may be reported to the user in a plurality of report formats and methods. Reports may be delivered via OLAP report client 210 in a standard report format, such as Microsoft Excel, Cognos PowerPlay, etc., or in a web format using eXtensible Stylesheet Language (XSL), etc. Reports may also be converted into a web-accessible format by report server 204 and sent directly to the user via VCI user interface 208 or via a web browser. In addition, the report data may be accessed and manipulated by modules 1-N 106 and sent directly to the user via VCI user interface 208. As noted earlier, user metadata database 206 preferably is an operational relational database that contains metadata about the users.

In accordance with the present invention, VCI user interface 208 preferably consists of a plurality of customizable objects and windows, which may be configured to display graphs, charts, tables, pop-up windows, text boxes, check boxes, status bars, etc. Each customizable object or window may be predefined or modified according to user needs, and may display a customized user interface that integrates a plurality of internal and external data. VCI user interface 208 may be accessed with a web browser via a PC, laptop, hand-held WAP device, etc.

In accordance with the present invention, VCI user interface 208 preferably organizes and displays a plurality of views of internal data 30, a plurality of views of external data 32, and a plurality of views of integrated data resulting from the analysis and integration of internal data 30 and external data 32 in data integration components 118. Data may be organized in VCI user interface 208 in a plurality of relevant categories, such as parts, part families, suppliers, contracts, news, market offerings, etc., which preferably are accessed via a plurality of linked windows and objects. For example, pertinent data may be organized according to part families, so that when the user selects a particular part or part family from a search page, all other related information for that part or part family (such as suppliers, contracts, market offerings, etc.) are organized and displayed to the user in an accessible format. Conventional visual, audio and tactile controls and features may be implemented for the user interface design, including a plurality of tabs, buttons, rollovers, sliders, check boxes, touch screens, dialog boxes, cascading menus, pop-up windows, drop-down lists, text messages, scroll bars, status bars, and time indicators, etc. Buttons may also appear in a plurality of states, such as normal, selected, default, and unavailable.

In an exemplary embodiment of the present invention, a user implementing one or a plurality of modules 1-N 1-6 preferably has access to an integrated view of data, such as internal data 30 about contracts, external data 32 about market offerings, etc. Accordingly, the user may define the parameters for criteria important to specific tasks in each module via VCI user interface 208. Modules 1-N 106 create templates for a plurality of views of the data (i.e., tables, graphs, etc.) and display them via VCI user interface 208. The data may be organized in VCI user interface 208 around parts, suppliers, contracts, news, market offerings, etc., with the ability to move from one such view to another through links. For example, all the pertinent information might be organized around individual parts or part families, so that when the user selects a particular part or part family from the search page, all other related data (from, for example, suppliers, contracts, news, news, market offerings, etc.) for that part or part family are organized and presented to the user.

In accordance with preferred embodiments of the present invention, VCI system 28 provides functions and services for a plurality of domains and subject matter experts, such as suppliers, manufacturers, procurement professionals, design engineers, etc. The functions and services allow such professionals to collaborate by gathering and synthesizing internal data 30 and external data 32 for direct material procurement. In addition, VCI system 28 provides functions and services for integrating design activities, procurement strategies, and supplier relationships with the existing infrastructure of an enterprise to increase supply chain efficiency. Thus, locating cheaper components and alternate sources for supplies, in addition to conducting collaborative design with buyers and suppliers, means that a company can bring new innovative products to market faster.

Thus, for example, VCI system 28 enables procurement professionals to perform the following actions:

Visualize the total set of components and raw materials within a manufacturing or purchasing organization enabling procurement organizations to save time in locating relevant information on components, prices, availability and component delivery times.

Make decisions by looking at 'what if', scenarios during the procurement decision making process. These situations may involve looking at different suppliers, or different demand levels, or analyzing the impact of component shortages.

Conduct analysis on inventory costs by reducing the cost of procurement for new components, when existing components can be substituted in their place.

Alert procurement and other supply chain professionals of various events regarding material procurement and status in order to ensure fulfillment meets their goals. These events may involve shortages, changes in component prices, quality problems, increases in Enterprise demand and schedule changes for a component.

Execute actions between supply chain partners, i.e. procurement, suppliers and designers, by releasing POs for components needed in manufacturing, contacting suppliers for quotations for lower price components, contacting suppliers to resolve shortage problems for components, selling excess inventory, etc.

Further, VCI system 28 provides a method for collaboration between one or a plurality of professionals and business units. For example, designers and procurement professionals preferably use VCI system 28 to collaborate with suppliers, and vice versa. Such collaboration may include one or a plurality of the following tasks:

Viewing the inventory of a part or plurality of parts provided by a supplier in the inventory system of an enterprise Viewing BOMs to see if any component should be supplied to a manufacturer that currently is not included in the part/supplier database, in addition to viewing any changes in the BOM on released models Viewing new components required by the manufacturer for bidding purposes Viewing all POs for components that have been fulfilled by a supplier or plurality of suppliers Viewing the current supplier rating status as viewed by the manufacturer based on delivery and quality performance ratings, in addition to viewing the ratings of similar suppliers as established by the manufacturer Viewing the production schedule for components that are currently being planned for production purposes Viewing any published documents attached to a component record in the part/supplier database Accordingly, data may be shared in a plurality formats, such as data views, files, reports, etc. between professionals and business units. Thus, in sharing data, professionals and business units may be able to collaborate to reach tactical and strategic business goals. This feature is particularly beneficial to suppliers since they can access critical enterprise data for their own decision-making processes.

In accordance with the present invention, data discovery module of module layer 86 provides access to a plurality of data (e.g., internal data 30, external data 32, integrated data based on some combination of internal data 30 and external data 32, etc.), so users may access, query, analyze and organize such data in a plurality of ways. Accordingly, users may employ data discovery module to perform one or a plurality of the following tasks:

Matching an equivalent, standard qualified part or parts to an internal part number from a parts/supplier database Matching a similar internal part or parts in the parts/supplier database to an external part number Matching qualified and non-qualified suppliers sources to an internal part number Generating a comparative price list for an internal part or set of internal parts to compare the respective contract prices with sales offer prices Generating a list of supplier sources for a part or parts within a part family Matching a buyer or plurality of buyers with contact information for an internal part or plurality of internal parts Providing lead-time history for a supplier of a part and/or for all suppliers within a part family Generating a lead-time rating for a supplier or plurality of suppliers Providing inspection and quality records for a supplier or plurality of suppliers Viewing a supplier rating for a supplier or plurality of suppliers within a part family, including but not limited to delivery, quality, and order fulfillment history Generating current inventory status for a part or plurality of parts in an inventory system or plurality of inventory systems Identifying weekly or monthly consumption rates for a part or plurality of parts from an inventory system or plurality of inventory systems Viewing a forecast or plurality of forecasts for all models containing a given part or plurality of parts Providing the stock out history for a part or plurality of parts and their respective supplier information Generating a list out order history for an internal part or plurality of internal parts Providing an aggregated list of parts for an aggregated list of models Viewing excess inventory for an internal part number or a plurality of internal part numbers Determining a component or plurality of components that can serve as a substitute for a particular component or plurality of components, and detecting market conditions for the substitute component or components that could have an impact on the price or availability for the particular component or plurality of components Further, alerts may automatically invoke a module or plurality of modules from module layer 86. For example, when the market price for SDRAM goes below or above a given percentage level of the contract price, then an alert may be accompanied by either an action to automatically purchase a predetermined number of SDRAM from an online marketplace or an action to automatically sell a predetermined number of SDRAM to an online marketplace; in addition, the same alert may be accompanied by a follow-up action in another module to either generate a purchase order in an appropriate format so that it may be passed as input to an enterprise purchasing system or generate a sale in an appropriate format so that it may be passed as input to an enterprise purchasing system. In another example, when a new supplier achieves a status rating (such as a "qualified" rating) for SDRAM or a certain family of DRAM, then the owner of the alert may be notified by e-mail of such an event, invoking the supplier allocation module of module layer 86 to re-calculate the percentage of business that should be allocated to suppliers for SDRAM and/or DRAM. Thus, an alert or plurality of alerts may automatically invoke a module or plurality of modules from module layer 86.

In accordance with the present invention, the following are some examples of alerts that may result in the action of notifying the owner of the alert, by e-mail, or some other means, of an event:

The lead-time has exceeded a certain limit for a supplier

The lead-time has exceeded a certain limit set by a supplier

An PO was placed with a non-qualified supplier

The number of lots delivered was less than the number of lots on the PO

The number of lots delivered was more than the number of lots on the PO

The price for a given component fell below or above a given percentage level from the contract price A component inventory has exceeded a certain threshold level (e.g., high limit, low limit, etc.)

The number of lots accepted is below a certain limit set for a supplier

The number of defects per lot is greater than a given limit

A PO has been placed on a non-qualified supplier

A new supplier achieved qualified status within a certain part family

An established supplier lost "approval" status

A component needed by a design group has no known supplier

A PO was placed on a different (but qualified) supplier for a component, which typically is procured from a standard supplier A new part that a given supplier should supply has been added to the BOM A part specification has been updated for a part in an existing BOM, and requires a change in supplier manufacturing processes.

The supplier finished goods inventory for a part that is being supplied falls below a certain level The supplier shipment date is beyond the date when the lot can arrive at the manufacturer's location Alert procurement organizations when components that currently do not exist in the part/supplier database are added to a BOM.

Alert and list out components in the BOM that have lead-times greater than a set lead-time limit.

Send alerts to users of procurement product and/or suppliers of any component being replaced (Engineering Change Order) for a BOM on a released model Alert a user of procurement product of a supplier-initiated delay in shipment Receive an alert for a change in the production schedule Receive an alert when a designated designer or a set of designers select a new component (currently not in the parts/supplier database) that belongs to the same category in which the supplier currently supplies in Receive an alert when a lot supplied by the supplier is rejected Receive an alert when a designer makes an engineering change on a component for an existing BOM Receive an alert when the inventory for the component supplied by the supplier drops below a certain minimum threshold Be alerted when the supplier rating drops below a certain level It should be further noted that the existence of data mart 74, which contains a plurality of normalized and integrated internal data 30 and external 32, facilitates the process of developing and processing alerts because the designers of modules, such as alert engine 94, only have to be concerned with the data that needs to be monitored and their respective relationships, and not with how this data is extracted, transformed, and loaded from their respective sources.

As will be appreciated, in accordance with the present invention one particular advantage is that in general rules or rule sets, such as those that alerts are comprised of, can be used as a general method for the user to define an automated or semi-automated action; in this case, "action" may include any action that can be taken by the system, such as adding something to some database, initiating a purchase action, etc.

In an exemplary embodiment of the present invention, a user may specify the following alert in VCI user interface 208 of VCI system 28: When at least one market price for a component with internal part number 01234 at an online marketplace is at least 20% lower than the average contract price for the component with internal part number 01234, then alert the user to specify the number of parts and subsequently generate a PO to purchase the specified amount at the market price from the online marketplace in an appropriate format, so that the data can be passed as input to an enterprise purchasing system. The alert generated at VCI user interface 208 is encoded in the appropriate format in alert engine 94. Alert engine 94 preferably monitors data mart 74 for online marketplace prices for internal part number 01234. The monitoring of such data preferably takes place in a plurality of ways, including database triggers, database queries for that value at regular intervals, etc. Similarly, alert engine 94 monitors the value of all contract prices for part 01234 in data mart 74. Alert engine 94 continuously compares the lowest of the obtained contract prices and the lowest of the obtained online marketplace prices in order to determine if the latter is at least 20% lower than the former. When such a condition is met, the data alert module in module layer 86 triggers an alert, invoking the purchase module in module layer 86 to generate a window in VCI user interface 208 for the user to input the desired amount of part 01234 to be purchased. Upon receipt of such input, a purchase module in module layer 86 generates a PO to purchase the specified amount of part 01234 at the market price from the online marketplace that offers such a part at the aforementioned lowest price, in an appropriate format, so that it can be passed as input to an enterprise purchasing system. It should be noted that depending on the user's preferences, alert engine 94 may instruct purchase module in module layer 86 to send an e-mail to the user that includes a clickable link, which may result in the aforementioned window in VCI user interface 208. Such an e-mail may be accompanied by any other form of notification, such as pager, voice mail, etc., or such a notification might be delivered without being accompanied by an e-mail.

Thus, in accordance with such an exemplary embodiment of the present invention, the contract price for part 01234 and the online marketplace prices for part 01234 represent exemplary embodiments of internal data 30 and external 32, respectively. Furthermore, contract prices for part 01234 may be located in one of custom databases 122, specifically in the contracts database, and accordingly is extracted by extract module 128, transformed by transform module 138, and loaded into discovery database 192 and analysis database 194, which comprise data mart 74, via load module 188. Similarly, online marketplace prices for part 01234 are obtained by continuously accessing marketplace database 156 and Internet sources 162, extracted by extraction module 172 and 174, transformed by transform module 184 and 186, and loaded into discovery databases 192 and analysis database 194 via load module 188.

It should be further noted that alerts that have been triggered are not the only means for automatically invoking a module in module layer 86. Preferably a module may also be invoked automatically as a result of an external event, such as a news story, that might have an impact or connection to an enterprise, industry and/or market, but still necessitate an action through one of the modules in module layer 86. For example, a fire at a production plant that manufactures parts that are supplied directly to an enterprise customer (or through a supplier that purchases parts from the owner of the plant and then sells them to the enterprise) might result in a disruption of the production schedule at that production plant, an event that may eventually affect the supply of parts for the production lines of the enterprise customer. Accordingly, VCI system 28 may quickly respond to such an event by, for instance, identifying alternate parts to replace the affected parts, identifying suppliers that might have available inventory of the affected parts that can be purchased immediately in anticipation of future shortage, or identifying buying opportunities in marketplaces for purchasing available inventory of the affected parts in anticipation of future shortage, etc. In accordance with the present invention, VCI system 28 preferably generates a prompt alert to the user for the purpose of curtailing any disruptions to the production schedule of the enterprise. Prompt action to such an external event is critical because other competitive enterprises using the same parts may also identify the danger to their production schedule and thus take corrective actions. The effect of a fire or other potentially disruptive events to the production of manufactured goods requires a complex series of steps as well as access to both internal data 30 and external data 32 in order to identify the precise effect that such an event at the manufacturer's plant may have on the enterprise's own production line.

In an exemplary embodiment of the present invention, a large enterprise, such as Hitachi or other electronic manufacturer, produces memory module 61466 at the semiconductor manufacturing facility in San Jose, Calif. VCI customer A, such as Dell Computer or other computer manufacturer, uses memory module 61466 for producing laptop model 5000. A significant portion of the VCI customer A's supply of memory module 61466 is produced at the Austin facility in Austin, Texas. Accordingly, the semiconductor facility in San Jose suffers a catastrophic event, such as a fire or a labor-related disruption, which might affect all or part of its future production of memory module 61466. Such an event is determined to have an adverse effect on the production of laptop model 5000, which in turn has an impact on the revenues and profits of the VCI customer A. The catastrophic event results in a news story that appears in a news wire, a local news source, etc. (Such a story is an example of external data 32 from news source 70 and may appear in Internet source 158 or subscription database 152.)

In accordance with the present invention, VCI system 28 preferably monitors external data sources 152 and 158 for such events, and extracts with extraction modules 164 and 166 news about the event, and stores the pertinent data, such as the type of event, date, time, manufacturer's name, location of the manufacturing facility, etc., in data mart 74. Accordingly, rules engine 96 is notified of this news event. Additional data is required by VCI system 28 in order to determine if this news event can have an impact on VCI customer A. (The additional data is a combination of internal data 30 and external data 32.) Accordingly, subscription content from internal data sources 158 and/or 152 provides information about which product families are manufactured at which manufacturing facilities. (Such geographic information, for example, is preferably presented as zip codes or similar such means.) Other subscription content provides information about the zip codes of city names and locations. Yet other subscription content provides information about the parts, preferably in terms of specific part numbers, which belong in a particular part family. In accordance with the exemplary embodiment, rules engine 96 preferably uses such data to infer which parts (preferably described as part numbers) are manufactured at the San Jose facility. Further additional data may be necessary to decide if the parts (preferably described as part numbers) appear in any produced goods of VCI customer A, and what is the precise effect of a disruption in the supply of memory module 61466 on VCI customer A. Accordingly, rules engine 96 queries data mart 74 for POs that include the identified part number or part numbers. Such data preferably was extracted from one of custom databases 122, such as the BOM database, by extract module 128, transformed by transform module 138, and loaded into discovery database 192 and analysis database 194, which comprise data mart 74, via load module 188.

Furthermore, data mart 74 preferably contains information about inventory levels of the previously identified part number and information about the production forecasts for laptop model 5000; such information has already been integrated in a similar manner into data mart 92. In accordance wit the exemplary embodiment, rules engine 96 infers that the previously identified part number appears in the BOM for laptop model 5000, and after calculating the available inventory of memory module 61466 and the production forecasts for laptop model 5000, preferably recommends an appropriate action. If available inventory covers the production needs specified by a product forecast for laptop model 5000, then the only action might be to alert the user of the event of the fire, preferably with a description of its reasoning process behind the alert, so that the user may become aware of the event for future decision making, even if no action is necessary at this time. However, if the available inventory lags behind the production forecast, then VCI system 28 preferably alerts the user of the event, again preferably with a description of its reasoning process behind the alert, and/or automatically invokes one or more modules for immediate action. For example, VCI system 28 preferably may invoke the purchasing module and recommend buying a specified number of memory modules 61466 in order to prevent any disruption to the production of laptop model 5000.

It should be noted that, in accordance with the present invention, if data is not available or present in data mart 74, then VCI system 28 while processing the event may ask the user to input the missing data, such as expected forecast, inventory levels, etc., regarding a particular part number. Thus, VCI system 28 preferably determines if it is necessary to ask the user for data that may not be present in data mart 74.

It should be further noted that, in accordance with the present invention, other types of events or natural disasters, such as earthquakes, floods, hurricanes, volcano eruptions, epidemics, tornados, power outages, bombings, shootings, labor strikes, etc. might damage a manufacturing facility or disrupt the logistics of transporting parts from a facility to the location of a production plant. Accordingly, like events may occur along standard transportation routes further disrupting the supply chain. Moreover, additional facilities, manufacturers, parts, and customers, may be affected by one or a plurality of such events. For example, there may be a third facility that has been adversely affected by an event, further complicating how VCI system 28 may be required to process the data. In accordance with the present invention, VCI system 28 preferably follows the rules and/or rules sets established by the user in order to determine the most appropriate action. The present invention is intended to embrace all of the alternatives and variations that fall within the spirit and scope of the invention.

In accordance with the present invention, BOM optimization module in module layer 86 preferably helps to determine the optimal allocation of components in the face of a component shortage. Thus, if there is a shortage of a component with part number X and if part number X is used in a plurality of products 1-N, then what should the manufactured quantities be considering the criteria set by procurement, manufacturing, and/or finance. For example, such criteria may include maximizing production, maximize revenues, maximizing margins, etc. Such an analysis takes into account the production schedule, demand forecast, inventory of components, their usage in each model, etc., and calculates the manufactured quantities, depending on the expressed aforementioned criteria. In response to an alert, an automatic invocation due to a news story, or the user's own initiative, the user preferably accesses the functionality of BOM optimization module in module layer 86 through the VCI user interface 208. Accordingly, the user specifies in the input window the part number to be considered for BOM optimal allocation. The input window, in turn, presents the data pertinent to the task of optimal BOM allocation data, such as production schedule, demand forecast, inventory of components, the models that use the part, their usage in each model, etc. It should be noted that the inventory data for the user-specified part is an example of internal data 30. The inventory data for such a part may be found, for example, in ERP system 124, extracted via business connector 148 and extract module 130 or 132, transformed by transform module 140 or 142, and loaded into discovery database 192 and analysis database 194 via load module 188. In accordance with the present invention, the specific type of business connector, extraction module, and transform module depends upon the specific data source for internal data 30, such as ERP system 52, MRP system 56, contracts databases 44, etc. The BOM optimization module in module layer 86 generally retrieves the needed data by querying data mart 74, but if certain of the required data are not available, then BOM optimization module may query the user manually input that data. Upon receiving the necessary data, the BOM optimization module preferably passes the data to analytics engine 99 for processing. Accordingly, analytics engine 99 applies a plurality of optimization tools and techniques, such as linear programming, integer programming, quadratic programming, constraint programming, etc., generally suitable for problems of discovering a solution, to the problem of maximizing or minimizing a mathematical formula given a set of constraints. Upon calculating the optimal solution, analytics engine 99 passes the solution to the BOM optimization module, which presents the solution to the user through VCI user interface 208. It should be noted that it is possible that such a solution may be transmitted or made available to the user in the form of a notification, such as e-mail, voice mail, pager message, etc. Such a notification may be particularly suitable in cases where the amount of time required for analytics engine 99 to calculate the optimal solution is significant or in cases where the user chooses to be notified in such a manner. Additionally, the user may specify that the solution discovered by analytics engine 99 be delivered, either by e-mail or some other form of notification, to a list of individuals, other than the user that initiated the request to the component BOM optimization module.

It should further be noted that, in accordance with the present invention, the existence of data mart 74, which contains a variety of integrated and normalized internal data 30 and external data 32, facilitates the development of the optimization code for the particular task (such as BOM allocation optimization) and the processing of the necessary data by the analytics engine 99, since the designers of analytics engine 99 need only be concerned with the data that needs to be monitored and their respective relationships, without being concerned about how this data is extracted, transformed and loaded from their respective sources.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method comprising:
    discovering, by a computer system, internal and external data related to a plurality of components to be procured by an enterprise, wherein the internal data originates from one or more data sources internal to the enterprise, and wherein the external data originates from one or more data sources external to the enterprise;
    storing, by the computer system, the discovered internal and external data in a data mart;
    analyzing, by the computer system, the internal and external data using a first analysis module to determine criticality ratings for the plurality of components, wherein the criticality rating for a component indicates the strategic importance of the component to operations of the enterprise, and wherein the analyzing performed using the first analysis module is based on a first set of user-defined parameters that qualify the internal or external data;
    analyzing, by the computer system, the internal and external data using a second analysis module to forecast prices for the plurality of components set by suppliers external to the enterprise, wherein the analyzing performed using the second analysis module is based on a second set of user-defined parameters that qualify the internal or external data;
    analyzing, by the computer system, the internal and external data using a third analysis module to determine optimal inventory levels for the plurality of components, wherein the analyzing performed using the third analysis module is based on a third set of user-defined parameters that qualify the internal or external data;
    analyzing, by the computer system, the internal and external data using a fourth analysis module to identify components in the plurality of components that are shortage risks, wherein the analyzing performed using the fourth analysis module is based on a fourth set of user-defined parameters that qualify the internal or external data;
    collecting and integrating the analyzed data from the first, second, third and fourth analysis modules through a plurality of algorithms that optimize the analyzed data based on the first, second, third and fourth set of user-defined parameters;
    recommending by the computer system, one or more proposed actions to take with respect to procurement of the plurality of components based on the collecting and integrating performed; and
    providing, by the computer system, one or more computer-initiated options for fully or partially executing an action in the one or more proposed actions.

2. The method of claim 1, wherein the discovered internal and external data stored in the data mart is organized for querying and report generation, and represented to the user in a plurality of formats.

3. The method of claim 1, further comprising producing, by the computer system, one or more reports based on the analyzing performed using the first, second, third, and fourth analysis modules, wherein the one or more reports provide the user with information regarding an impact or potential impact of the discovered internal and external data on procurement decisions, sourcing decisions and strategic sourcing decisions in the enterprise with respect to the plurality of components, and wherein the one or more reports include information displayed in one or more graphical formats.

4. The method of claim 3, wherein the one or more graphical formats include a table, chart, graph, or map.

5. The method of claim 1, further comprising producing, by the computer system, one or more reports based on the analyzing performed using the first, second, third, and fourth analysis modules, wherein the one or more reports provide the user with information regarding an impact or potential impact of the discovered internal and external data on procurement decisions, sourcing decisions and strategic sourcing decisions in the enterprise with respect to the plurality of components, and wherein the one or more reports include information represented in one or more non-graphical formats.

6. The method of claim 5, wherein the one or more non-graphical formats include a news bulletin, an alert box, or an audio message.

7. The method of claim 1, wherein the step of discovering internal and external data assists the user in identifying parameters for criteria relevant to procurement decisions, sourcing decisions and strategic sourcing in the enterprise regarding the plurality of components.

8. The method of claim 7, wherein the parameters are user-defined.

9. The method of claim 1, wherein the steps of analyzing the discovered internal and external data using the first, second, third, and fourth analysis modules uses data from the step of discovering the internal and external data to produce one or more reports intended to assist the user in procurement decisions, sourcing decisions, or strategic sourcing decisions.

10. The method of claim 1, wherein the step of recommending one or more proposed actions uses data from the steps of analyzing the discovered internal and external data using the first, second, third, and fourth analysis modules to make recommendations for possible actions based on the discovered internal and external data.

11. The method of claim 1, wherein the steps of analyzing the discovered internal and external data using the first, second, third, and fourth analysis modules collects data from the step of discovering the internal and external data and additional data from user input to make recommendations in real time.

12. The method of claim 1, wherein the step of executing one or more actions uses data from the steps of analyzing the discovered internal and external data using the first, second, third, and fourth analysis modules as input for the user to decide which recommendations to execute and when to execute them.

13. The method of claim 1, wherein the step of discovering internal and external data collects, integrates and displays graphical and non-graphical data.

14. The method of claim 1, wherein the step of discovering internal and external data includes extraction, transformation and loading of data, scanning of data that has been aggregated across a single business unit or across multiple business units of the enterprise, conducting of real-time searching, and customizing of real-time alerts and news feeds.

15. The method of claim 1, wherein the step of executing one or more actions enables the user to set automation levels at either a first level, which provides a greater range of permitted automated actions, or at a second level, which provides a more restricted range of permitted automated actions.

16. The method of claim 15, wherein additional automation levels are selectable by the user, providing a plurality of customized ranges of permitted automated actions.

17. The method of claim 1, wherein the step of executing one or more actions provides agents that follow user-defined rules to enable hands-free handling of user-defined exceptions and processes.

18. The method of claim 1, wherein the step of executing one or more actions initiates a transaction via another application, carries out one or a plurality of transactions, and changes information in the another application.

19. The method of claim 1, wherein the step of executing one or more actions includes providing agents that follow user-defined rules to enable hands-free handling of user-defined exceptions and processes, initiating a transaction via another application, and carrying out certain transactions, wherein the certain transactions include generating and sending out a RFQ and changing discovered internal and external data in an internal application.

20. The method of claim 1, wherein the internal and external data are reintegrated into the data mart after each step of the method is performed, and wherein the data is continuously incorporated into the data mart automatically or at predetermined or other intervals.

21. The method of claim 1, further comprising alerting the user of conditions that are relevant to the user's tasks in procurement, sourcing, or strategic sourcing.

22. The method of claim 21, wherein the conditions include values, combinations of values, and conditions for the values and combinations of values.

23. The method of claim 1 further comprising:
analyzing, by the computer system, the internal and external data using a fifth analysis module to determine, for each component in the plurality of components, an allocation of a purchase quantity of the component across a set of suppliers, wherein the allocation is based on contractual obligations with the set of suppliers and performance ratings for the set of suppliers, and wherein the analyzing performed using the fifth analysis module is based on a fifth set of user-defined parameters that qualify the internal or external data.

24. The method of claim 1 further comprising:
receiving, by the computer system, a condition pertaining to the internal or external data; and
if the condition is satisfied, sending an alert to the user.

25. The method of claim 1 wherein the criticality rating for a component in the plurality of components is based on one or more variables including profit impact of the component, a number of products that would be affected by a shortage of the component, and a current inventory level of the component.

26. The method of claim 1 wherein the optimal inventory levels for the plurality of components are based on inventory holding costs, revenue impact of stocking out of the components, and warehouse constraints.

27. The method of claim 1 wherein the one or more data sources internal to the enterprise include:
a supplier database comprising information about suppliers of the plurality of components;
a contracts database comprising information about supplier contracts;
an internal parts database comprising information about products incorporating the plurality of components;
a supply chain data database comprising information about inventory levels for the plurality of components, warehouse locations, and production schedules; and
an enterprise resource planning (ERP) database comprising information about accounting ledgers and financial records related to the plurality of components.

28. The method of claim 27 wherein the one or more data sources external to the enterprise include:
electronic product databases comprising information about products sold by one or more external suppliers, the information including pricing, availability, and lead time; and subscription sources comprising information about industry trends and market news.

29. A system comprising:
a storage device configured to store internal and external data related to a plurality of components to be procured by an enterprise, wherein the internal data originates from one or more data sources internal to the enterprise, and wherein the external data originates from one or more data sources external to the enterprise; and
a processing component communicatively coupled with the storage device, the processing component being configured to:
analyze the internal and external data using a first analysis module to determine criticality ratings for the plurality of components, wherein the criticality rating for a component indicates the strategic importance of the component to operations of the enterprise, and wherein the analyzing performed using the first analysis module is based on a first set of user-defined parameters that qualify the internal or external data;

analyze the internal and external data using a second analysis module to forecast prices for the plurality of components set by suppliers external to the enterprise, wherein the analyzing performed using the second analysis module is based on a second set of user-defined parameters that qualify the internal or external data;

analyze the internal and external data using a third analysis module to determine optimal inventory levels for the plurality of components, wherein the analyzing performed using the third analysis module is based on a third set of user-defined parameters that qualify the internal or external data;

analyze the internal and external data using a fourth analysis module to identify components in the plurality of components that are shortage risks, wherein the analyzing performed using the fourth analysis module is based on a fourth set of user-defined parameters that qualify the internal or external data;

collect and integrate the analyzed data from the first, second, third and fourth analysis modules through a plurality of algorithms that optimize the analyzed data based on the first, second, third and fourth set of user-defined parameters;

recommend one or more proposed actions to take with respect to procurement of the plurality of components based on the collecting and integrating performed; and provide one or more computer-initiated options for fully or partially executing an action in the one or more proposed actions.

30. A non-transitory computer readable storage medium having stored thereon instructions executable by a computer system, the instructions comprising:

instructions that cause the computer system to discover internal and external data related to a plurality of components to be procured by an enterprise, wherein the internal data originates from one or more data sources internal to the enterprise, and wherein the external data originates from one or more data sources external to the enterprise;

instructions that cause the computer system to store the discovered internal and external data in a data mart;

instructions that cause the computer system to analyze the internal and external data using a first analysis module to determine criticality ratings for the plurality of components, wherein the criticality rating for a component indicates the strategic importance of the component to operations of the enterprise, and wherein the analyzing performed using the first analysis module is based on a first set of user-defined parameters that qualify the internal or external data;

instructions that cause the computer system to analyze the internal and external data using a second analysis module to forecast prices for the plurality of components set by suppliers external to the enterprise, wherein the analyzing performed using the second analysis module is based on a second set of user-defined parameters that qualify the internal or external data;

instructions that cause the computer system to analyze the internal and external data using a third analysis module to determine optimal inventory levels for the plurality of components, wherein the analyzing performed using the third analysis module is based on a third set of user-defined parameters that qualify the internal or external data;

instructions that cause the computer system to analyze the internal and external data using a fourth analysis module to identify components in the plurality of components that are shortage risks, wherein the analyzing performed using the fourth analysis module is based on a fourth set of user-defined parameters that qualify the internal or external data;

instructions that cause the computer system to collect and integrate the analyzed data from the first, second, third and fourth analysis modules through a plurality of algorithms that optimize the analyzed data based on the first, second, third and fourth set of user-defined parameters;

instructions that cause the computer system to recommend one or more proposed actions to take with respect to procurement of the plurality of components based on the collecting and integrating performed; and instructions that cause the computer system to provide one or more computer-initiated options for fully or partially executing an action in the one or more proposed actions.

* * * * *